(12) United States Patent
Makino et al.

(10) Patent No.: US 8,273,164 B2
(45) Date of Patent: Sep. 25, 2012

(54) FUEL VAPOR PROCESSORS

(75) Inventors: Katsuhiko Makino, Aichi-ken (JP); Masanobu Shinagawa, Ama (JP); Hideki Teshima, Ama (JP); Takashi Mani, Hekinan (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 312 days.

(21) Appl. No.: 12/829,473

(22) Filed: Jul. 2, 2010

(65) Prior Publication Data

US 2011/0011264 A1 Jan. 20, 2011

(30) Foreign Application Priority Data

Jul. 14, 2009 (JP) ................. 2009-165525

(51) Int. Cl.
*F02M 25/08* (2006.01)
*B01D 53/04* (2006.01)

(52) U.S. Cl. ............... 96/134; 96/143; 123/519
(58) Field of Classification Search ..... 95/146; 96/4, 108, 134, 143; 123/518, 519
See application file for complete search history.

(56) References Cited

U.S. PATENT DOCUMENTS

| | | | | |
|---|---|---|---|---|
| 5,253,629 A | * | 10/1993 | Fornuto et al. | 123/519 |
| 6,363,921 B1 | * | 4/2002 | Cook et al. | 123/520 |
| 6,367,457 B1 | * | 4/2002 | Mancini et al. | 123/516 |
| 7,448,367 B1 | * | 11/2008 | Reddy et al. | 123/520 |
| 7,647,920 B2 | * | 1/2010 | Amano et al. | 123/519 |
| 2010/0288241 A1 | * | 11/2010 | Makino et al. | 123/521 |

FOREIGN PATENT DOCUMENTS

| | | |
|---|---|---|
| JP | 10259765 | 9/1998 |
| JP | 11342313 | 12/1999 |
| JP | 2000104630 | 4/2000 |
| JP | 2000282966 | 10/2000 |
| JP | 2003314381 | 11/2003 |
| JP | 2005061305 | 3/2005 |
| JP | 2005199223 | 7/2005 |
| JP | 2009000646 | 1/2009 |

* cited by examiner

*Primary Examiner* — Frank Lawrence, Jr.
(74) *Attorney, Agent, or Firm* — Dennison, Schultz & MacDonald

(57) ABSTRACT

A fuel vapor processor has a fuel tank, a canister, a vapor pipe, a recovery pipe, an air pipe, a suction device, a vapor pipe valve, an air pipe valve, and a pressure regulator. The vapor pipe leads fuel vapor generated in the fuel tank to the canister for trapping the fuel vapor in the canister. The recovery pipe recoveries the fuel vapor desorbed from the canister into the fuel tank. The air pipe communicates the canister with the atmosphere. The suction device is disposed on the recovery pipe for desorbing the fuel vapor trapped in the canister. The pressure regulator is communicated with the air pipe between the air pipe valve and the canister in order to allow gas flow from the atmosphere toward the canister. During desorption of the fuel vapor due to the suction device, the vapor pipe valve and the air pipe valve are closed, and negative pressure is kept in the canister such that the fuel vapor is desorbed from the canister and fresh air is led into the canister via the pressure regulator.

8 Claims, 16 Drawing Sheets

FUEL VAPOR PROCESSORS

CROSS-REFERENCES TO RELATED APPLICATIONS

This application claims priority to Japanese patent application serial number 2009-165525, the components of which are incorporated herein by reference.

BACKGROUND OF THE INVENTION

1. Field of the Invention

The present invention relates to devices for treating fuel vapor, in particular, fuel vapor processors for trapping fuel vapor, which has vaporized in a fuel tank, in a canister and recovering the fuel vapor from the canister to the fuel tank due to a suction device.

2. Description of the Related Art

A gas vehicle is equipped with a fuel vapor processor for preventing fuel vapor vaporized in a fuel tank from flowing into the atmosphere for environmental protection or the like. The fuel vapor processor includes a canister filled with adsorbent and temporally traps the fuel vapor by adsorbing the fuel vapor onto the adsorbent. As for a conventional fuel vapor processor shown in Japanese Laid-Open Patent Publication No. 10-259765, the canister and an air intake pipe for an engine are communicated with each other via a purge pipe, and the fuel vapor trapped in the canister is removed due to negative pressure generated in the air intake pipe while driving the engine. The removed fuel vapor is delivered to the air intake pipe through the purge pipe and then is used for engine combustion. In addition, with respect to Japanese Laid-Open Patent Publication No. 10-259765, an air pipe communicating the canister with the atmosphere has an air pipe valve for opening and closing the air pipe, and the fuel tank has a pressure sensor for detecting inner pressure of the fuel tank, and thus back-purge is allowable. In particular, when the inner pressure of the fuel tank reaches allowable lower limit for negative pressure due to decrease in fuel temperature during parking or the like, a controller (ECU) repeatedly opens and closes the air pipe valve such that fresh air (ambient air) is led into the canister while keeping negative pressure in the fuel tank. Periods for opening and closing the air pipe valve are controlled depending on alteration of pressure in the fuel tank.

In this way, the fuel vapor processor in Japanese Laid-Open Patent Publication No. 10-259765 is configured as "purge system" for purging and delivering the fuel vapor to the air intake pipe due to negative pressure in the air intake pipe. Recently, the number of vehicles equipped with "idling stop system" or "hybrid system", e.g., for reducing fuel consumption or exhaust fumes increases. As for the vehicles with such system, opportunities for generating negative pressure in the air intake pipe decrease. For example, "idling stop system" stops the engine during stopping at a red light or the like, so that it is not able to utilize negative pressure in the air intake pipe during stopping. Whereas, "hybrid system" stops the engine during drive mode by an electric motor, so that it is not able to utilize negative pressure in the air intake pipe during such drive mode. Thus, opportunities for removing the fuel vapor trapped in the canister decrease, so that the adsorbent in the canister cannot be renewed adequately. Therefore, it is difficult to appropriately treat the fuel vapor. In addition, some of vehicles equipped with "direct injection fuel engine" for directly injecting fuel into a combustion chamber do not have any throttle valve, so that it is difficult for this type vehicle to purge the fuel vapor trapped in the canister into the air intake pipe.

Therefore, fuel vapor processors including "purge-less evaporation system" without purging the fuel vapor to the air intake pipe have been provided. Some of such fuel vapor processors are disclosed in, e.g., Japanese Laid-Open Patent Publications No. 2003-314381 and No. 2000-282966. Each of these fuel vapor processors has a canister for trapping fuel vapor generated in a fuel tank, a vapor pipe for delivering the fuel vapor from the fuel tank to the canister, a recovery pipe for recovering the fuel vapor removed from the canister into the fuel tank, an air pipe communicating the canister with the atmosphere, a vacuum pump (suction device) disposed on the recovery pipe for removing the fuel vapor trapped in the canister, a vapor pipe valve for opening and closing the vapor pipe, and an air pipe valve for opening and closing the air pipe. During removal of the fuel vapor due to the vacuum pump, the vapor pipe valve and the air pipe valve are closed such that the fuel vapor is removed while keeping negative pressure in the canister. That is, during removal operation of the fuel vapor, an inner space of the canister except the recovery pipe is hermetically closed.

In detail, Japanese Laid-Open Patent Publication No. 2003-314381 discloses a separation membrane disposed on the recovery pipe downstream of the vacuum pump for separating gas including the fuel vapor removed from the canister into fuel components and air in order to obtain concentrated gas with increased concentration of the fuel vapor and diluted gas with decreased concentration of the fuel vapor. The concentrated gas separated by the separation membrane is recovered to the fuel tank while cooling the concentrated gas due to a cooler including a peltier element in order to accelerate devolatilization. Whereas, the diluted gas separated by the separation membrane can be returned into the canister through a return pipe. Japanese Laid-Open Patent Publication No. 2000-282966 discloses a dispersion device disposed on an end of the recovery pipe. The recovered fuel vapor is dispersed into the fuel in order to increase solubility of the fuel vapor due to this dispersion device. Japanese Laid-Open Patent Publication No. 2009-000646 discloses a fuel vapor processor for recovering fuel vapor generated in a fuel tank by a pressure swing adsorption device having two towers, however the disclosed fuel vapor processor is used for gas station and is not mounted on a vehicle.

The fuel vapor processor disclosed in Japanese Laid-Open Patent Publication No. 10-259765 utilizes negative pressure in the air intake pipe, so that it would be difficult to mount the processor on a vehicle having "idling stop system" or "hybrid system". The fuel vapor processors disclosed in either Japanese Laid-Open Patent Publication No. 2003-314381 or No. 2000-282966 recover the fuel vapor into the fuel tank due to the vacuum pump, so that the fuel vapor processors can be mounted on any type vehicles. During recovery operation for the fuel vapor by the vacuum pump, negative pressure is kept in the canister. Thus, inner space of the fuel vapor processor except the recovery pipe is hermetically closed, so that ambient air does not flow into the canister during removal operation. So, while inner pressure of the canister gradually decreases, gas flows in the canister, so that the fuel vapor can be desorbed. However, when the inner pressure of the canister reaches a limit for pressure reduction, gas hardly flows in the canister, so that fuel vapor cannot be removed any more. Therefore, desorption efficiency (desorption amount) is not enough.

According to a result of examination as for desorption efficiency of fuel vapor by inventors of this invention, it has been found that desorption efficiency in a condition that negative pressure is kept in the canister and fresh air flows into the canister is better than that of a case that fresh air does not flow into the canister. In particular, gas containing 50% butane was supplied to a canister filled with 3 litter of activated carbon as adsorbent such that butane adsorbs over breakthrough of 2 gram. Then, desorption amounts either in a case that air (fresh air) flew into the canister or in a case that air did not flow into the canister were measured while keeping negative pressure in the canister according to conditions shown in Table 1 due to a vacuum pump. Here, air flew into the canister at 1.5 L/min for 30 min (total 45 litter). Results of such examination are shown in Table 1.

TABLE 1

| Condition | Airflow | Negative Pressure (kPa) | Desorption amount (g) |
|---|---|---|---|
| 1 | ○ | 0 (atmospheric pressure) | 39.7 |
| 2 | ○ | −40 | 59.9 |
| 3 | ○ | −70 | 78.4 |
| 4 | ○ | −85 | 98.6 |
| 5 | × | −70 | 6.0 |

The results in Table 1 show that in a case that fuel vapor was desorbed while flowing fresh air into the canister, the lower inner pressure of the canister was, the higher desorption efficiency was. In particular, compared with condition 1 where the fuel vapor was desorbed at atmospheric pressure, desorption amount was about 1.5 times in condition 2 where −40 kPa of negative pressure was provided to the canister, desorption amount was about 2 times in condition 3 where −70 kPa of negative pressure was provided to the canister, and desorption amount is about 2.5 times in condition 4 where −85 kPa of negative pressure was provided to the canister. On the other hand, a result of condition 5 shows that desorption amount was drastic low in a condition that −70 kPa of negative pressure was provided to the canister and fresh air did not flow into the canister compared with a condition that the fuel vapor was desorbed while flowing fresh air into the canister.

In disclosure of Japanese Laid-Open Patent Publication No. 10-259465, back-purge is carried out due to negative pressure when inner pressure of the fuel tank decreases by fuel temperature reduction during parking, and pressure is controlled such that negative pressure is kept in the fuel tank while flowing fresh air into the canister. However, a suction device such as vacuum pump is not provided, so that when the inner pressure of the fuel tank reaches allowable lower limit for negative pressure, back-purge takes place.

In Japanese Laid-Open Patent Publication No. 2003-314381, a separation membrane, a fuel vapor cooler, a canister heater and the like are provided in order to improve treatment efficiency and treatment capacity. However, peltier element is used for the cooler, and piezo element is used for the heater. Thus, the number of members required for power distribution increases, so that the numbers of members such as distributing cable and assembly steps increase, and consumed power and loss during power transmission also increase. In addition, separation efficiency by the separation membrane is not 100%, so that diluted gas separated by the separation membrane would include components of fuel. Thus, there is a need for improved fuel vapor processors mounted in a vehicle for efficiently removing the fuel vapor trapped in the canister.

SUMMARY OF THE INVENTION

One aspect according to a fuel vapor processor of the present invention includes a fuel tank, a canister, a vapor pipe, a recovery pipe, an air pipe, a suction device, a vapor pipe valve, an air pipe valve, and a pressure regulator. The vapor pipe leads fuel vapor generated in the fuel tank to the canister for trapping the fuel vapor in the canister. The recovery pipe recoveries the fuel vapor desorbed from the canister into the fuel tank. The air pipe communicates the canister with the atmosphere. The suction device is disposed on the recovery pipe for desorbing the fuel vapor trapped in the canister. The pressure regulator is communicated with the air pipe between the air pipe valve and the canister in order to allow gas flow from the atmosphere toward the canister. During desorption of the fuel vapor due to the suction device, the vapor pipe valve and the air pipe valve are closed, and negative pressure is kept in the canister such that fresh air is led into the canister via the pressure regulator and the fuel vapor is removed from the canister.

Here, the negative pressure means pressure below atmospheric pressure.

In accordance with this aspect, during desorption of the fuel vapor, fresh air is led into the canister via the pressure regulator while keeping negative pressure in the canister, so that it is able to ensure gas flow and to increase desorption efficiency. Thus, recovery amount of the fuel vapor is improved and the adsorbent in the canister can be renewed well, so that treating capacity can be increased.

DETAILED DESCRIPTION OF THE PREFERRED EMBODIMENTS

Each of the additional features and teachings disclosed above and below may be utilized separately or in conjunction with other features and teachings to provide improved fuel vapor processors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In this disclosure, the term "negative pressure" means pressure below atmospheric pressure, and the term "back-purge" means desorption of fuel vapor due to decrease in fuel temperature (vapor pressure) during nighttime or pressure reduction in the fuel tank when consuming fuel.

Figure 1:
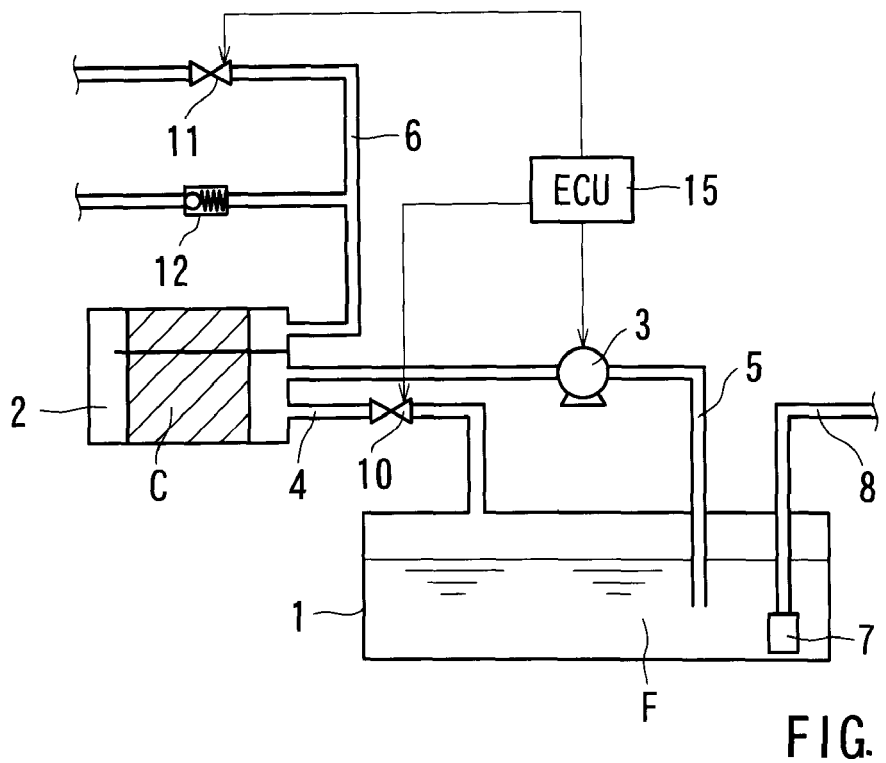
FIG. 1 is a schematic view of a first embodiment of fuel vapor processors.

One embodiment of the fuel vapor processors of the present disclosure has a canister 2 for trapping fuel vapor generated in a fuel tank 1, and a vacuum pump 3 for removing the fuel vapor trapped in the canister 2 as shown in FIG. 1. The fuel tank 1 and the canister 2 are communicated with each other via a vapor pipe 4. The fuel vapor generated in the fuel tank 1 is delivered to the canister 2 through the vapor pipe 4. The canister 2 is connected with a recovery pipe 5 extending into the fuel tank 1 such that the fuel vapor removed from the canister 2 is recovered into the fuel tank 1 through the recovery pipe 5. In addition, the canister 2 is connected with an air pipe 6 for communicating the canister 2 with the atmosphere.

The fuel tank 1 reserves gasoline fuel F, and the fuel F is supplied to an engine (not shown) through a fuel supply pipe 8 due to actions of fuel pump 7 disposed in the fuel tank 1. The vacuum pump 3 is disposed on the recovery pipe 5 and suctions gas in the canister 2 via the recovery pipe 5. The vacuum pump 3 is composed of an electric pump controlled by an electric control unit (ECU) 15, in particular when to start and stop. The vacuum pump 3 has a check valve (not shown) inside the vacuum pump 3 for preventing gas flow toward the canister 2 from the fuel tank 1. The vacuum pump 3 is one example of the suction device of the present disclosure. The canister 2 is filled with adsorbent C made of activated carbon or the like for selectively trapping the fuel vapor and allowing air to pass through the canister 2.

The vapor pipe 4 is provided with a vapor pipe valve 10 for switching an open state and a closed state of the vapor pipe 4. The air pipe 6 is provided with an air pipe valve 11 for switching an open state and a closed state of the air pipe 6. The vapor pipe valve 10 and the air pipe valve 11 are composed of solenoid valves controlled by the ECU 15. The ECU 15 has a central processing unit (CPU), a read only memory (ROM), a random access memory (RAM), a backup RAM, an external input circuit and an external output circuit, etc. The ROM stores control programs for vapor recovery or the like. The RAM temporarily stores data calculated by the CPU. The CPU controls the vacuum pump 3 and the like depending on signals transmitted via the input circuit.

The air pipe 6 is further communicated with a pressure regulation valve 12 for keeping inner pressure of the canister 2 at a certain level. The pressure regulation valve 12 is composed of a check valve for allowing gas flow toward the canister 2 from an outer space only in a condition that the inner pressure of the canister 2 decreases below a predetermined pressure (for example, −70 kPa) and is communicated with the air pipe 6 between the air pipe valve 11 and the canister 2. It is able to control negative pressure in the canister 2 during removal operation for the fuel vapor by adequately altering the predetermined pressure for the pressure regulation valve 12. The pressure regulation valve 12 is one example of the pressure regulator of the present disclosure.

When the vehicle is parked (an ignition switch or starter is in off position), the vapor pipe valve 10 and the air pipe valve 11 are open. Thus, the fuel vapor generated in the fuel tank 1 during parking is led into the canister 2 through the vapor pipe 4, and then is adsorbed by the adsorbent C. Air passes through the canister 2 and flows into the atmosphere from the air pipe 6 via the air pipe valve 11. Therefore, it is able to avoid drastic increase in the inner pressure of the fuel tank 1.

When the ignition switch or the starter is turned on in order to drive the vehicle, the vapor pipe valve 10 and the air pipe valve 11 are closed and the vacuum pump 3 is started due to actions of the ECU 15. Because gas in the canister 2 is suctioned due to the vacuum pump 3, the fuel vapor trapped in the canister 2 is desorbed and recovered into the fuel tank 1 through the recovery pipe 5. In this condition, the vapor pipe valve 10 and the air pipe valve 11 are closed, so that pressure in the canister 2 gradually decreases. Then, when negative pressure in the canister 2 reaches a predetermined value, fresh air is led into the canister 2 via the pressure regulation valve 12. In this way, during removal operation for the fuel vapor from the canister 2 due to the vacuum pump 3, fresh air is led into the canister 2 via the pressure regulation valve 12 while keeping negative pressure in the canister 2, so that it is able to drastically improve removal efficiency for the fuel vapor.

The vacuum pump 3 is stopped after a predetermined period of time. At the same time, the vapor pipe valve 10 and the air pipe valve 11 are opened. During driving a vehicle, it is able to make the vacuum pump 3 repeatedly start and stop such that the vapor pipe valve 10 and the air pipe valve 11 are repeatedly opened and closed depending on operating condition of the vacuum pump 3. When the engine is stopped, the vapor pipe valve 10 and the air pipe valve 11 are opened along with stop of the vacuum pump 3.

The fuel vapor processor of the present disclosure is basically purgeless evaporation system for recovering the fuel vapor removed from the canister into the fuel tank 1, however, the fuel vapor processor can be combined with a purge system for delivering the fuel vapor into the air intake pipe. Configurations of a second embodiment is substantially corresponds to those of the first embodiment further having the purge system. Thus, some configurations of the second embodiment different from the first embodiment will be described mainly.

Figure 2:
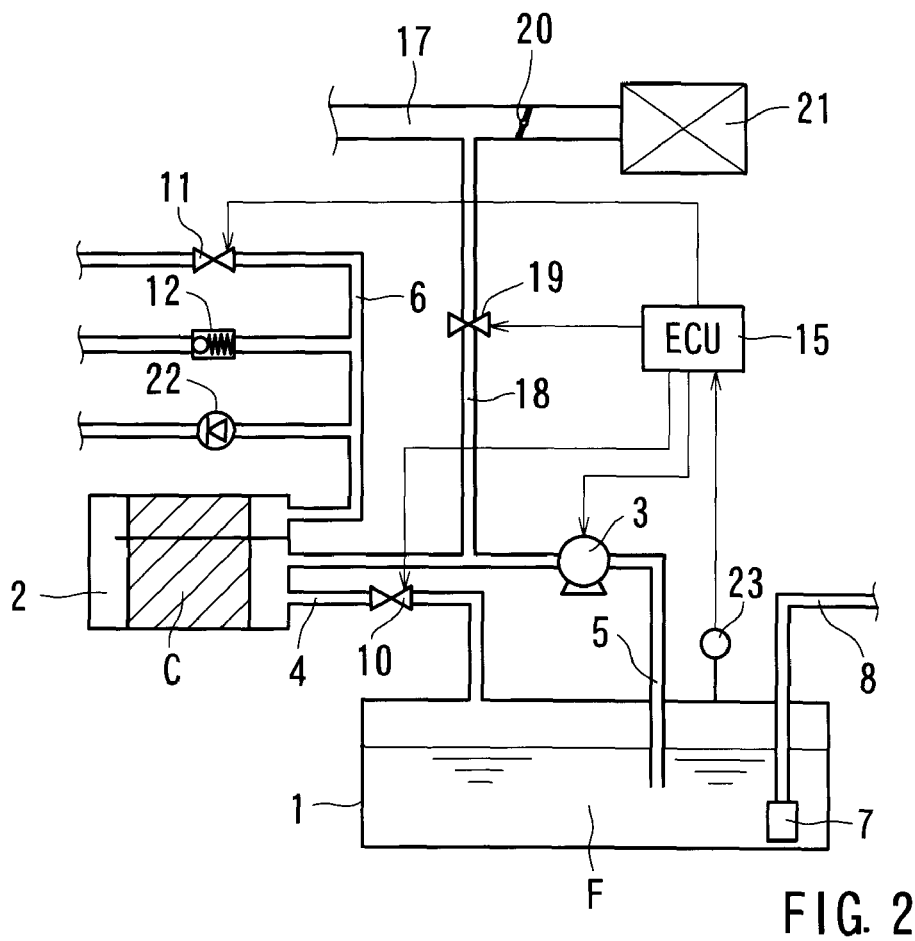
FIG. 2 is a schematic view of a second embodiment of fuel vapor processors.

As shown in FIG. 2, the recovery pipe 5 is communicated with an air intake pipe 17 via a purge pipe 18 between the canister 2 and the vacuum pump 3 in the second embodiment. The purge pipe 18 is provided with a purge pipe valve 19 for switching an open state and a closed state of the purge pipe 18. The purge pipe valve 19 is composed of a solenoid valve controlled by the ECU 15. The air intake pipe 17 is provided with a throttle valve 20 for controlling an amount of air intake, and is connected with an air cleaner 21. In addition, the air pipe 6 between the air pipe valve 11 and the canister 2 is communicated with a pipe equipped with a one-way valve 22, which allows gas flow from the canister 2 toward the outer space. Further, the fuel tank 1 is provided with a pressure sensor 23 for detecting inner pressure of the fuel tank 1. The pressure sensor 23 is one example of the inner pressure detector. The inner pressure detected by the pressure sensor 23 is translated into signals, and then the signals are transmitted to the ECU 15.

In a state that the ignition switch or the like is off, the vapor pipe valve 10 is open, whereas the air pipe valve 11 and the purge pipe valve 19 are closed. When the fuel vaporizes in the fuel tank 1 in this state, the fuel vapor is led into the canister 2 via the vapor pipe valve 10 like the first embodiment, however air passing through the canister 2 is released into the atmosphere via the one-way valve 22. When the ignition switch or the like is turned on, the air pipe valve 11 and the purge pipe valve 19 are opened. In addition, when the engine is driven, air is led to the engine from the air cleaner 21 while controlling flow rate of air in the air intake pipe 17 due to the throttle valve 20. Then, negative pressure in the air intake pipe 17 acts on the purge pipe 18, so that the fuel vapor is removed from the canister 2 due to the negative pressure and is delivered into the engine through the purge pipe 18 and the air intake pipe 17. In this state, the air pipe valve 11 is also open, so that fresh air is led into the canister 2 through the air pipe 6. Here, during purge operation for the fuel vapor due to the negative pressure in the air intake pipe 17, the vacuum pump 3 is stopped. When stopping the engine, the air pipe valve 11 and the purge pipe valve 19 are closed again.

Furthermore, the inner pressure in the fuel tank 1 may become negative pressure because vapor pressure in the fuel tank 1 decreases when the fuel warmed during daytime is cooled during nighttime or when a large amount of the fuel is consumed. For example, in a case that a fuel temperature during daytime is over 40° C., when the fuel temperature decreases below 20° C. during nighttime, the inner pressure in the fuel tank 1 may become negative pressure. In this case, there is a risk of back-purge that the fuel vapor trapped in the canister 2 is led into the fuel tank 1 due to negative pressure in the fuel tank 1. Therefore, the second embodiment is designed such that when the pressure sensor 23 detects inner pressure of the fuel tank 1 below the predetermined value during stopping the engine, the vacuum pump 3 is driven and the vapor pipe valve 10 and the air pipe valve 11 are opened or closed in order to recover the fuel vapor trapped in the canister 2 through the recovery pipe 5 into the fuel tank 1. In addition, when the detected pressure is below another predetermined value, fresh air can flow through the pressure regulation valve 12 while keeping a negative pressure condition like the first embodiment. There are two control mechanisms during back-purge. In particular, in a first control mechanism, decrease in the inner pressure of the canister 2 synchronizes that of the inner pressure of the fuel tank 1. Whereas, in a second control mechanism, the decrease in the inner pressure of the canister 2 does not synchronize that of the fuel tank 1.

Figure 3:
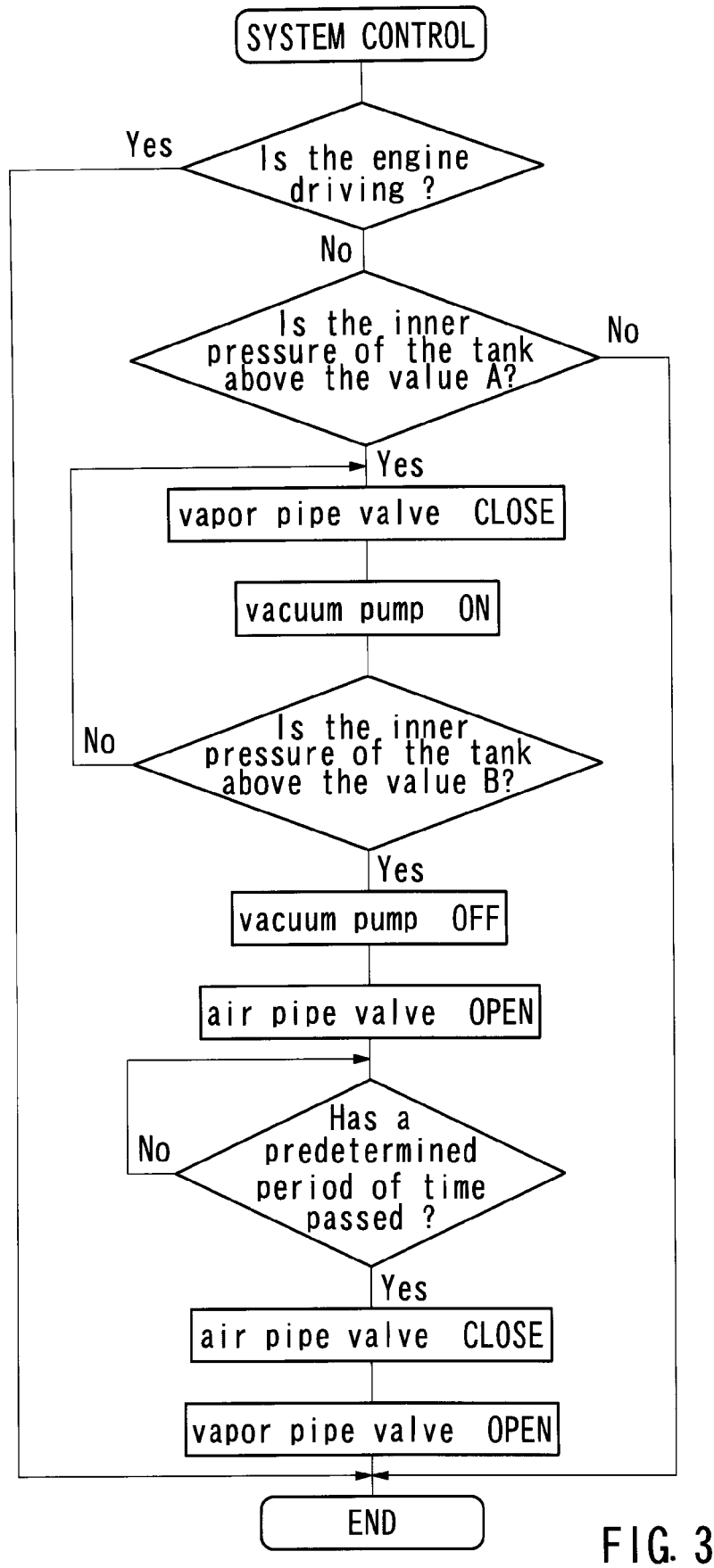
FIG. 3 is a first control flow chart of the second embodiment during back-purge.
Figure 4:
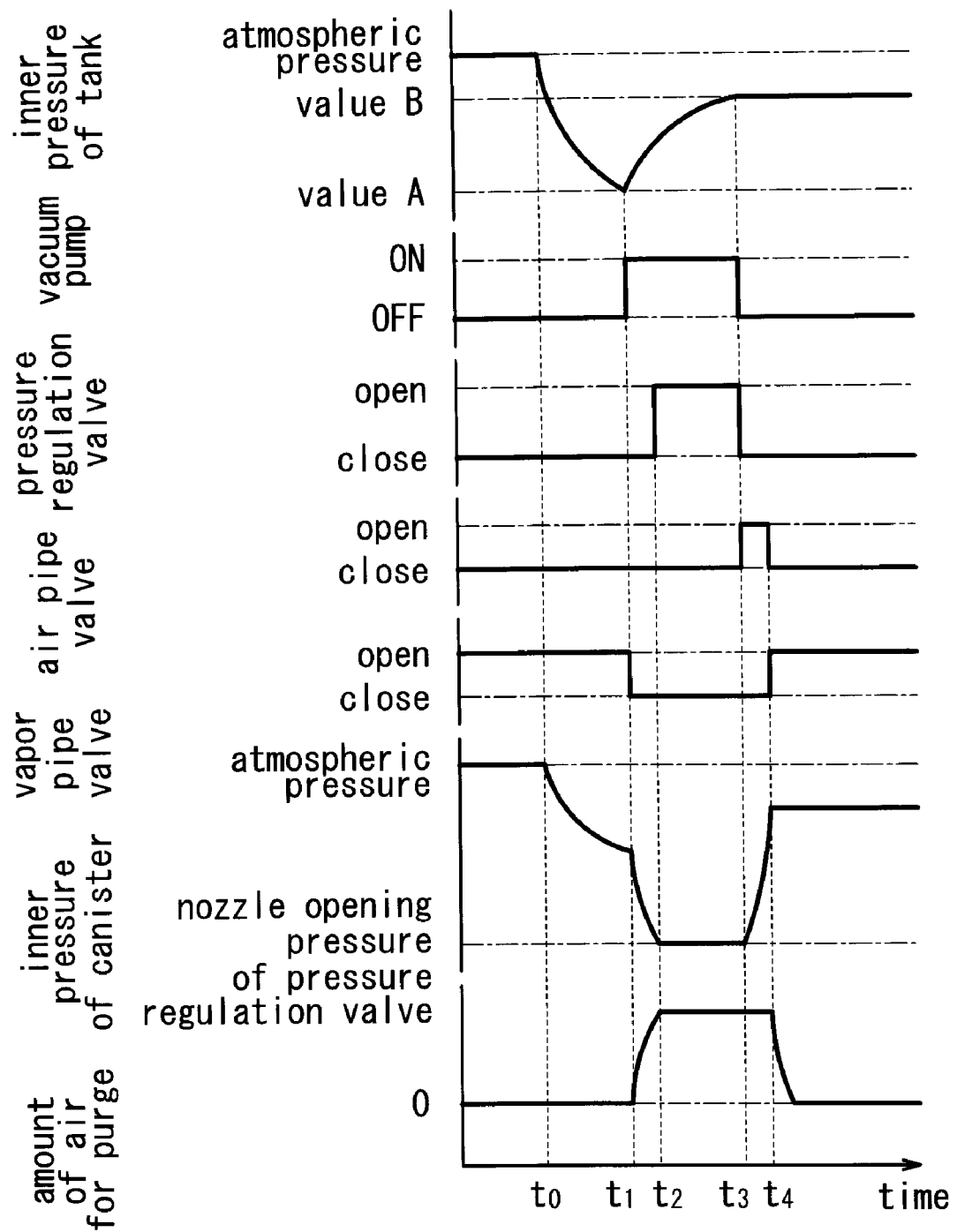
FIG. 4 is a correlation diagram showing operation of each element by the control flow in FIG. 3.

The first control mechanism where the inner pressure of the fuel tank 1 synchronizes that of the canister 2 will be described based on the flowchart of FIG. 3 and the correlation diagram of FIG. 4. During driving the engine, the canister 2 is purged due to negative pressure in the air intake pipe 17, so that control for back-purge is not carried out. In addition, in a condition that the inner pressure in the fuel tank 1 becomes negative pressure during stopping the engine, when the inner pressure is above a predetermined value (value A), the control for back-purge is not carried out. However, because the vapor pipe valve 10 is open, when the inner pressure of the fuel tank 1 becomes negative pressure ($t_0$ in FIG. 4), the inner pressure of the canister 2 also becomes negative pressure, so that a slight amount of the fuel vapor is removed from the canister 2. Furthermore, when the pressure sensor 23 detects the inner pressure of the fuel tank 1 below the value A during stopping the engine, the vapor pipe valve 10 is closed and the vacuum pump 3 is driven ($t_1$ in FIG. 4). The value A is not specifically limited. However, because the vacuum pump 3 is used, there is no need that the value A is set at a lowest negative pressure acceptable for the fuel tank 1. In addition, the vacuum pump 3 provides negative pressure in the canister 2, so that the value A can be above a setting pressure for the pressure regulation valve 12. For example, the value A can be between about −60 kPa to about −20 kPa.

When the vacuum pump 3 is driven, negative pressure is provided at the canister 2, and the inner pressure of the fuel tank 1 gradually increases due to recovery of the fuel vapor. Then, when the inner pressure of the canister 2 becomes below the setting pressure for the pressure regulation valve 12 ($t_2$ in FIG. 4), fresh air flows into the canister 2 through the pressure regulation valve 12, so that an amount of the fuel vapor removed from the canister drastically increases while keeping a certain negative pressure in the fuel tank 1. When the pressure sensor 23 detects that the inner pressure of the fuel tank 1 reaches a value B more than the value A ($t_3$ in FIG. 4), the vacuum pump 3 is stopped, so that the inner pressure of the fuel tank 1 is stabilized. The value B can be more than the value A and less than a value of the atmospheric pressure and is not further limited. However, the value B is preferably is near (slightly less than) the value of the atmospheric pressure in view of desorption efficiency. Simultaneously, the air pipe valve 11 is opened, so that air is led into the canister 2 through the air pipe valve 11 in order to drastically increase the inner pressure of the canister 2. The pressure regulation valve 12 is closed when the inner pressure of the canister 2 increases. The air pipe valve 11 is open for a short time such that the inner pressure of the canister 2 can recover to some extent. It is able to open the air pipe valve 11 until the inner pressure of the canister 2 reaches the atmospheric pressure, however, a time for increasing the inner pressure near the atmospheric pressure is sufficient. After a predetermined time from opening the air pipe valve 11 ($t_4$ in FIG. 4), the air pipe valve 11 is closed again, and the vapor pipe valve 10 is simultaneously opened. In this way, the control for back-purge is finished.

Figure 5:
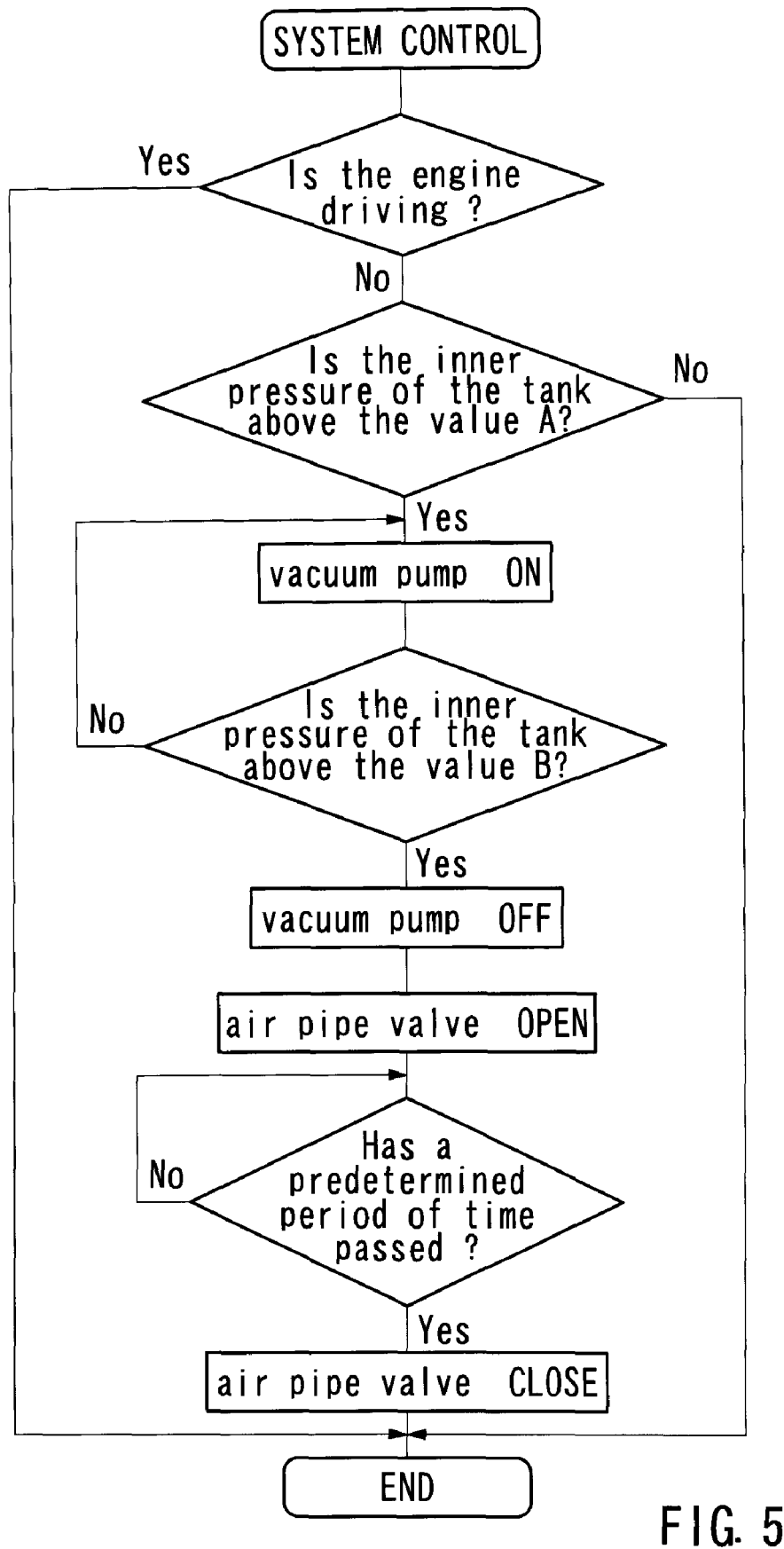
FIG. 5 is a second control flow chart of the second embodiment during back-purge.
Figure 6:
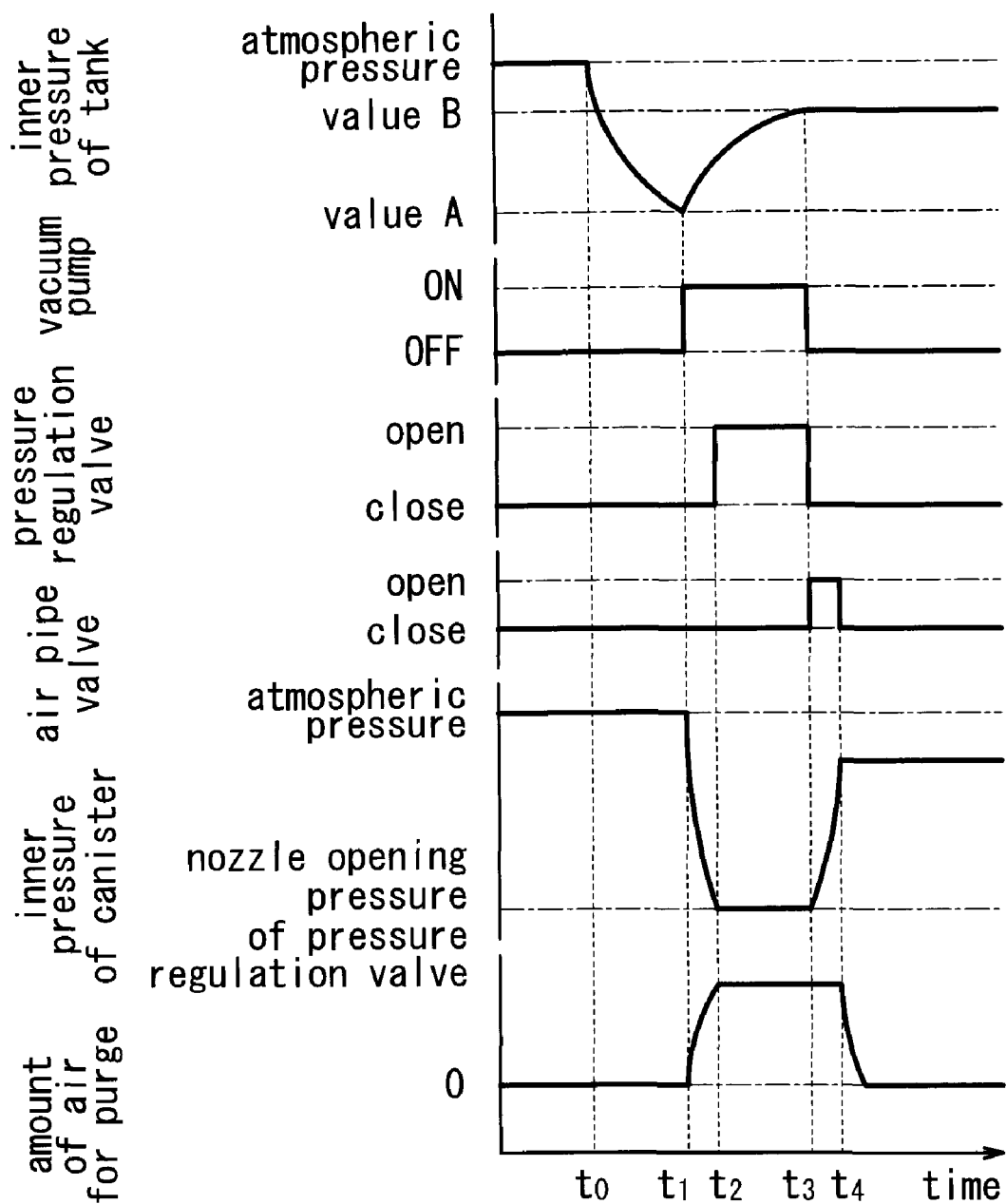
FIG. 6 is a correlation diagram showing operation of each element by the control flow in FIG. 5.

The second control mechanism where the inner pressure of the fuel tank 1 does not synchronize with that of the canister 2 will be described based on the flowchart in FIG. 5 and the correlation diagram in FIG. 6. In the second control mechanism, the control for back-purge is not carried out during driving the engine like the first control mechanism because the canister 2 is purged due to the negative pressure in the air intake pipe 17. However, when the engine is stopped, the vapor pipe valve 10 is closed unlike the first control mechanism. Therefore, when the inner pressure of the fuel tank 1 decreases, the inner pressure of the canister 2 does not decrease ($t_0$ to $t_1$ in FIG. 6). After the pressure sensor 23 detects the inner pressure of the fuel tank 1 below the value A during stopping the engine ($t_1$ in FIG. 6), control is carried out in a same manner as the first control mechanism except the vapor pipe valve 10 is not opened and closed. According to the second control mechanism, because the vapor pipe valve 10 is not opened unless the inner pressure of the fuel tank 1 decreases below the value A during stopping the engine, the fuel vapor is not successively trapped in the canister 2. Thus, it is able to reduce processing load due to engine drive. Here, in the second control mechanism, the vapor pipe valve 10 can be closed when the pressure sensor 23 detects initiation of a decrease in the inner pressure of the fuel tank 1 ($t_0$ in FIG. 6). Other configurations of the second control mechanism are same as those of the first control mechanism, so that corresponding elements are labeled with the same symbols or reference numbers, and they will not be described.

In the first and second control mechanisms, as for a time $t_4$ for re-closing the air pipe valve 11, the air pipe valve 11 can be closed after a predetermined period of time, or can be closed when a pressure sensor disposed in the canister 2 detects the inner pressure of the canister 2 lower than a predetermined value. The inner pressure of the canister 2 increases due to intake of fresh air via the air pipe valve 11, so that unnecessary fuel vapor is not led into the canister 2. That is, gas in the fuel tank 1 does not flow into the canister 2 during increase in the inner pressure of the canister 2, so that undesired fuel vapor does not flow into the canister 2.

Figure 7:
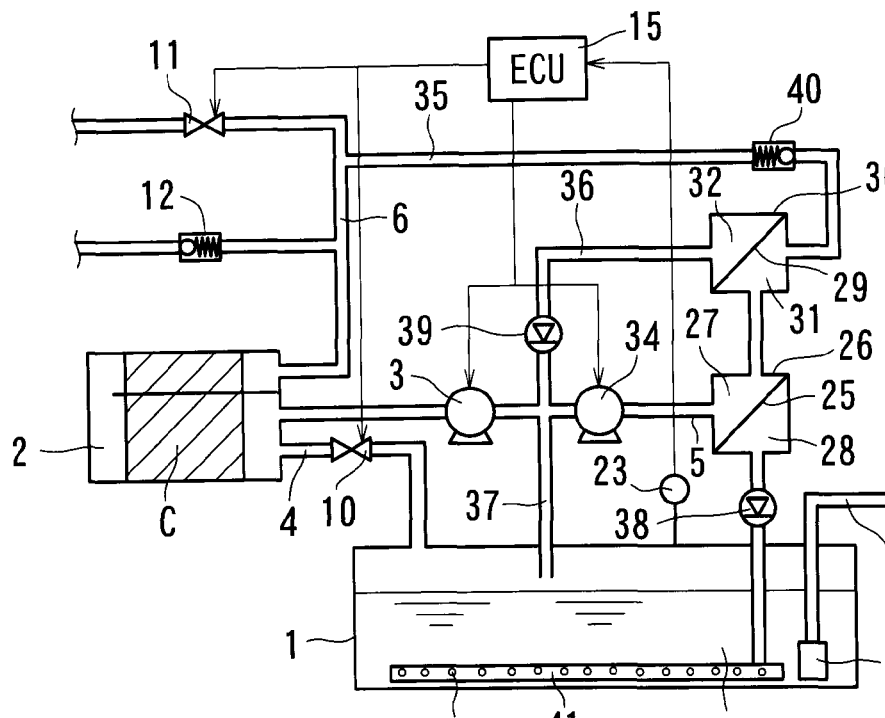
FIG. 7 is a schematic view of a third embodiment of fuel vapor processors.

A third embodiment shown in FIG. 7 has separation membranes capable of separating gas including the fuel vapor into components of the fuel and components of air in addition to the configuration of the first embodiment in order to obtain a concentrated gas with increased concentration of the fuel vapor and a diluted gas with decreased concentration of the fuel vapor. The third embodiment is a two-step separation system including a first separation membrane 25 and a second separation membrane 29. The first separation membrane 25 and the second separation membrane 29 are modularized. The first separation membrane 25 is disposed on the recovery pipe 5 downstream of the vacuum pump 3 and divides an inner space of an enclosed container 26 into a receiving chamber 27 and a permeated gas chamber 28. The second separation membrane 29 divides an inner space of an enclosed container 30 into a receiving chamber 31 and a permeated gas chamber 32, and the receiving chamber 31 is communicated with the receiving chamber 29. The components of fuel can cross the separation membranes 25 and 29 in a shorter time than other gases such as air, so that the separation membranes 25 and 29 can preferentially allow the components of fuel in gas including fuel vapor to cross the membranes in order to separate the gas into the concentrated gas and the diluted gas. Each of the separation membranes is made of, e.g., silicon rubber, and is a plate, hollow tube, spiral, honeycomb or the like in shape. In the third embodiment, the separation membranes 25 and 29 are made of porous ceramics in honeycomb shape with a coating of silicon rubber. In accordance with this structure, silicon rubber having relatively low pressure resistance is reinforced by ceramics support such that structural strength is increased. In addition, the honeycomb structure increases surface area of the separation membrane in order to improve separating velocity for the components of fuel. Foundation cloth, resinous foam, metal mesh or the like can be used as support instead of porous ceramics in honeycomb shape.

A pressure pump 34 is disposed on the recovery pipe 5 between the vacuum pump 3 and the separation membrane 25 and provides differential pressure between upstream sides of the separation membranes 25 and 29 (receiving chambers 27 and 31) and permeated gas sides (permeated gas chambers 28 and 32). The receiving chamber 31 for the second separation membrane 29 is connected with a return pipe 35 for returning the second diluted gas diluted by the second separation membrane 29 to the air pipe 6. Whereas, the permeated gas chamber 32 for the second separation membrane 29 is connected with a circulation pipe 36 for circulating the second concentrated gas concentrated by the second separation membrane 29 into the recovery pipe 5 between the vacuum pump 3 and the pressure pump 34. In addition, the recovery pipe 5 between the vacuum pump 3 and the pressure pump 34 is connected with a second vapor pipe 37 extending into the fuel tank 1.

The recovery pipe 5 extending from the first separation membrane 25 to the fuel tank 1 is provided with a check valve 38 for preventing backflow of the fuel F in the fuel tank 1. And, the circulation pipe 36 is also provided with a check valve 39 for preventing gas flow from the recovery pipe 5 toward the second separation membrane 29. In addition, the return pipe 35 is provided with a second pressure regulation valve 40, which is opened for allowing gas flow when the pressure is over a predetermined value. The second pressure regulation valve 40 is provided in order to keep pressure in a space between the pressure pump 34 and the pressure regulation valve 40 at a constant value, and to make pressurized force act on the first and second separation membranes 25 and 29. The predetermined value can be, e.g., about 150 kPa. An end of the recovery pipe 5 is equipped with a bubbler 41. The bubbler 41 is made of a tube having a large number of pores 42 and extending at whole bottom of the fuel tank 1 and emits bubbles of the recovered fuel vapor into the fuel F.

The third embodiment has the same configuration as the first embodiment with respect to gas (fuel vapor or air) flow when the ignition switch or the like is in off position. When the ignition switch or the like is turned on, the vapor pipe valve 10 and the air pipe valve 11 are closed, and the vacuum pump 3 and the pressure pump 34 are driven. Then, gas including fuel vapor desorbed from the adsorbent in the canister 2 (referred to as desorbed gas, hereinafter) is pumped toward the first separation membrane 25. The desorbed gas is separated into a first concentrated gas, which has passed through the first separation membrane 25, and a first diluted gas remaining in the receiving chamber 27. The first concentrated gas separated by the first separation membrane 25 is led from the permeated gas chamber 28 through the recovery pipe 5 to the bubbler 41, and is made in a bubble shape and released into the fuel F. In this way, the first separation membrane 25 improves recovery efficiency of the fuel vapor, and the bubbler 41 simultaneously improves solubility of the fuel vapor. Here, when the pumps 3 and 34 are in operation, the vapor pipe valve 10 is closed. Fuel vapor generated in the fuel tank during this period is led through the second vapor pipe 37, the recovery pipe 5 and the pressure pump 34 to the first separation membrane 25, and then is concentrated and recovered.

The first diluted gas separated by the first separation membrane 25 is pumped to the second separation membrane 29. Then, the first diluted gas is separated into a second concentrated gas, which has passed the second separation membrane 29, and a second diluted gas remaining in the receiving chamber 31. The second concentrated gas is led from the permeated gas chamber 32 to the recovery pipe 5 through the circulation pipe 36, and is pumped toward the first separation membrane 25 by the pressure pump 34 again. On the other hand, the second diluted gas has been separated twice, so that concentration of the fuel vapor in the second diluted gas is adequately decreased. And then, the second diluted gas is led into the air pipe 6 through the return pipe 35 and is used as fresh air for renewing the adsorbent C in the canister 2.

The higher the concentration of the fuel vapor in the provided gas is, the more effectively the separation membrane can separate the fuel vapor. Therefore, the first separation membrane 25 can separate most components of the fuel in the desorbed gas. The second separation membrane 29 adequately reduces the concentration of the fuel in the returned gas (the second diluted gas). In addition, the larger pressure difference between the receiving chamber and the permeated gas chamber there is, the more effectively the separation membrane can separate the fuel vapor. Therefore, the third embodiment has the pressure pump 34 and the second pressure regulation valve 40. Thus, pressure in an area from the pressure pump 34 through the receiving chamber 27 for the first separation membrane 25 and the receiving chamber 31 for the second separation membrane 29 to the second pressure regulation valve 40 is certainly increased, so that pressure difference from the permeated gas chamber 28 for the first separation membrane 25 or the permeated gas chamber 32 for the second separation membrane 29 in order to improve the separation efficiency due to the separation membranes 25 and 29. In this way, the pressure pump 34 is used for increasing pressure difference, so that the pressure pump 34 can be referred to as differential pressure pump. Other configurations of the third embodiment are same as those of the first embodiment, and the third embodiment includes the same mechanism for back-purge as the second embodiment, so that corresponding elements are labeled with the same symbols or reference numbers, and they will not be described.

Figure 8:
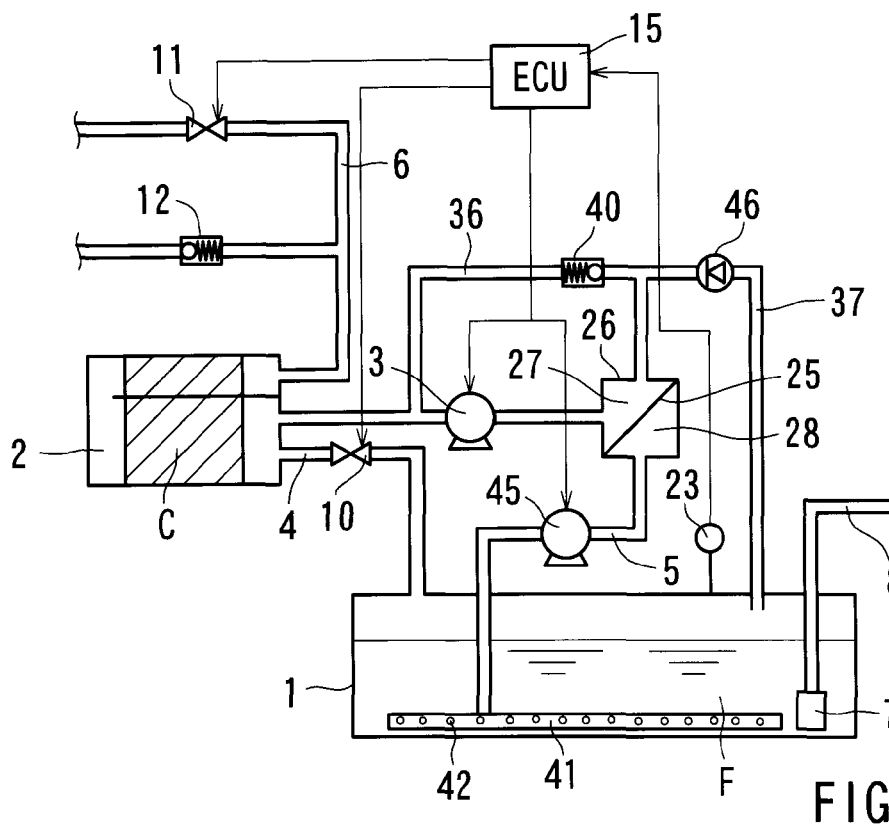
FIG. 8 is a schematic view of a fourth embodiment of fuel vapor processors.

The third embodiment includes two separation membranes and the pressure pump as the differential pressure pump. However, a single separation membrane can be used, and a decompression pump generating negative pressure acting on the separation membrane can be used as the differential pressure pump. A fourth embodiment shown in FIG. 8 has only the separation membrane 25 disposed on the recovery pipe 5 as one step separation system. A separation membrane module including the separation membrane 25 of this embodiment is same as the separation membrane module including the first separation membrane 25 of the third embodiment. In addition, a decompression pump 45 as differential pressure pump is disposed on the recovery pipe 5 between the separation membrane 25 and the fuel tank 1. The decompression pump 45 pumps gas from the separation membrane 25 toward the fuel tank 1, and is controlled by the ECU 15. The decompression pump 45 includes a check valve (not shown) therein for preventing backflow of the fuel F in the fuel tank 1 into the recovery pipe 5. The second vapor pipe 37 for leading the fuel vapor regenerated in the fuel tank 1 is connected with the circulation pipe 36. A check valve 46 for preventing gas flow from the separation membrane 25 to the fuel tank 1 is disposed on the second vapor pipe 37. In addition, the second pressure regulation valve 40 is disposed on the circulation pipe 36.

When the ignition switch or the like is in off position, the vapor pipe valve 10 and the air pipe valve 11 are open, and gas flow in this state is substantially same as that of the first embodiment. When the ignition switch or the like is turned on, the vapor pipe valve 10 and the air pipe valve 11 are closed, and the vacuum pump 3 and the decompression pump 45 are driven. Then, the vacuum pump 3 provides negative pressure in the canister 2, and fresh air flows into the canister 2 via the pressure regulation valve 12, so that the fuel vapor is removed from the canister 2 and is provided to the receiving chamber 27 for the separation membrane 25 through the recovery pipe 5. At this time, the permeated gas chamber 28 downstream of the separation membrane 25 is depressurized due to the decompression pump 45, so that the permeated gas chamber 28 has pressure difference from the receiving chamber 27. Therefore, separation efficiency by the separation membrane 25 is improved, and the concentrated gas separated and concentrated by the separation membrane 25 is recovered into the fuel tank 1 through the recovery pipe 5. The diluted gas including the remaining fuel vapor, which has not been separated by the separation membrane 25, in the receiving chamber 27 is circulated through the circulation pipe 36 into the recovery pipe 5 upstream of the vacuum pump 3 again. At this time, the fuel vapor regenerated in the fuel tank 1 is led through the second vapor pipe 37 and the circulation pipe 36 and then into the recovery pipe 5. Other configurations of the fourth embodiment are same as those of the first embodiment, and the fourth embodiment includes the same mechanism for back-purge as the second embodiment, so that corresponding elements are labeled with the same symbols or reference numbers, and they will not be described.

Figure 9:
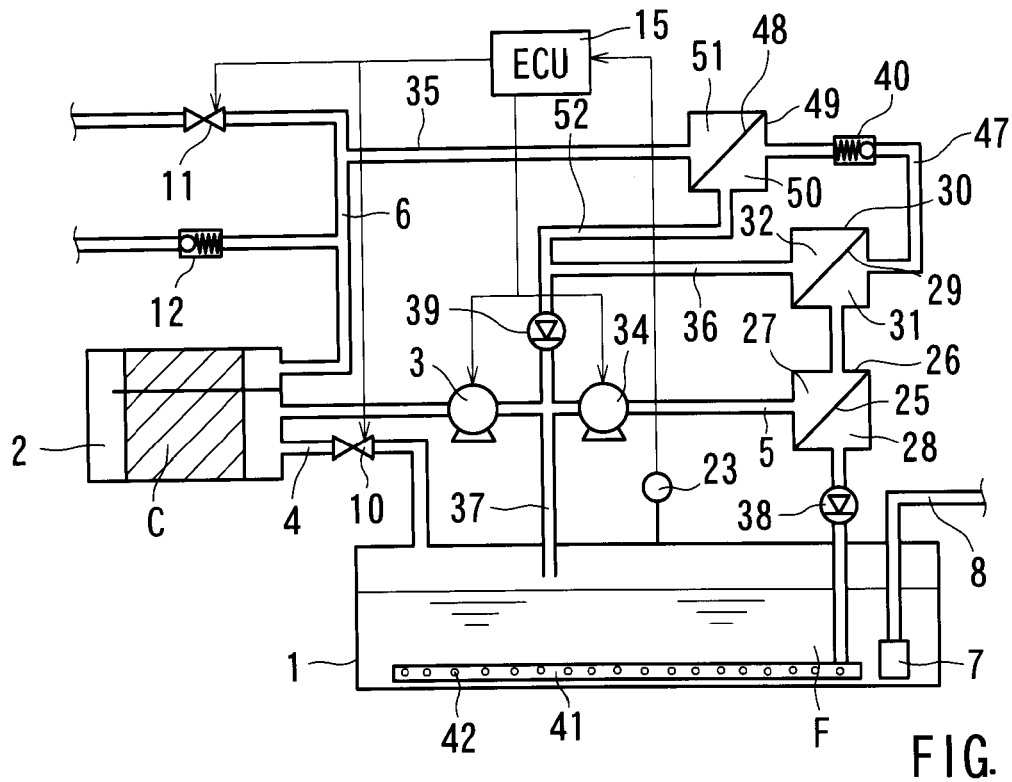
FIG. 9 is a schematic view of a fifth embodiment of fuel vapor processors.

Further, three separation membranes can be provided to establish a three-step separation system. A fifth embodiment shown in FIG. 9 includes an additional separation membrane in addition to the configuration of the third embodiment, which is two-step separation system. In particular, the second separation membrane 29 is communicated with a third separation membrane 48 via a connection pipe 47. The third separation membrane 48 is also modularized, and an inner space of an enclosed container 49 is divided into a receiving chamber 50 and a permeated gas chamber 51 by the third separation membrane 48. In addition, the receiving chamber 31 for the second separation membrane 29 is communicated with the receiving chamber 50 for the third separation membrane 48 via the connection pipe 47. The second pressure regulation valve 40 is disposed on the connection pipe 47. Further, the receiving chamber 50 for the third separation membrane 48 is connected with a second circulation pipe 52. The return pipe 35 is connected with the permeated gas chamber 51 for the third separation membrane 48.

The first and second separation membranes 25 and 29 work as concentration membrane for allowing the components of the fuel to pass through the membrane rather than other components in order to concentrate the fuel vapor, whereas the third separation membrane 48 works as dilution membrane for allowing air to pass through the membrane rather than fuel vapor in order to dilute the fuel vapor. For the third separation membrane 48 as dilution membrane, materials having higher solubility and diffusion coefficient of air than those of the components of the fuel are used. For example, fluorinated resin such as poly-dimethyl siloxane having high solubility of both oxygen and nitrogen can be preferably used. Basic configuration as separation membrane is same as those of the first and second separation membranes 25 and 29.

When the ignition switch or the like is in off position, the vapor pipe valve 10 and the air pipe valve 11 are open. When the ignition switch or the like is turned on, the vapor pipe valve 10 and the air pipe valve 11 are closed, and the vacuum pump 3 and the pressure pump 34 are started. Then, the vacuum pump 3 provides negative pressure in the canister 2, so that fresh air flows into the canister 2 via the pressure regulation valve 12 in order to remove the fuel vapor from the canister 2. At this time, negative pressure due to the vacuum pump 3 acts on the permeated gas chamber 51 for the third separation membrane 48. Thus, separation efficiency by the third separation membrane 48 is increased. The fifth embodiment includes the same mechanism due to the first separation membrane 25 and the second separation membrane 29 as that of the third embodiment. In addition, the second diluted gas separated by the second separation membrane 29 is led into the receiving chamber 50 for the third separation membrane 48 through the connection pipe 47. And then, the components of air in the second diluted gas preferentially pass through the third separation membrane 48. Thus, the permeated gas chamber 51 contains a third diluted gas having further decreased fuel components, and the third diluted gas is returned to the canister 2 through the return pipe 35. Whereas, a third concentrated gas remaining in the receiving chamber 50 is circulated to the recovery pipe 5 through the second circulation pipe 52. Other basic configurations of the fifth embodiment are same as those of the first or third embodiment, and the fifth embodiment includes the same mechanism for back-purge as the second embodiment, so that corresponding elements are labeled with the same symbol or reference number, and they will not be described.

In addition, in the fifth embodiment, the second pressure regulation valve 40 can be disposed on the second circulation pipe 52. In this case, pressurized force due to the pressure pump 34 acts on the receiving chamber 50 for the third separation membrane 48 in addition to the receiving chamber 27 for the first separation membrane 25 and the receiving chamber 31 for the second separation membrane 29, so that separation efficiency by the third separation membrane 48 is further increased.

Figure 10:
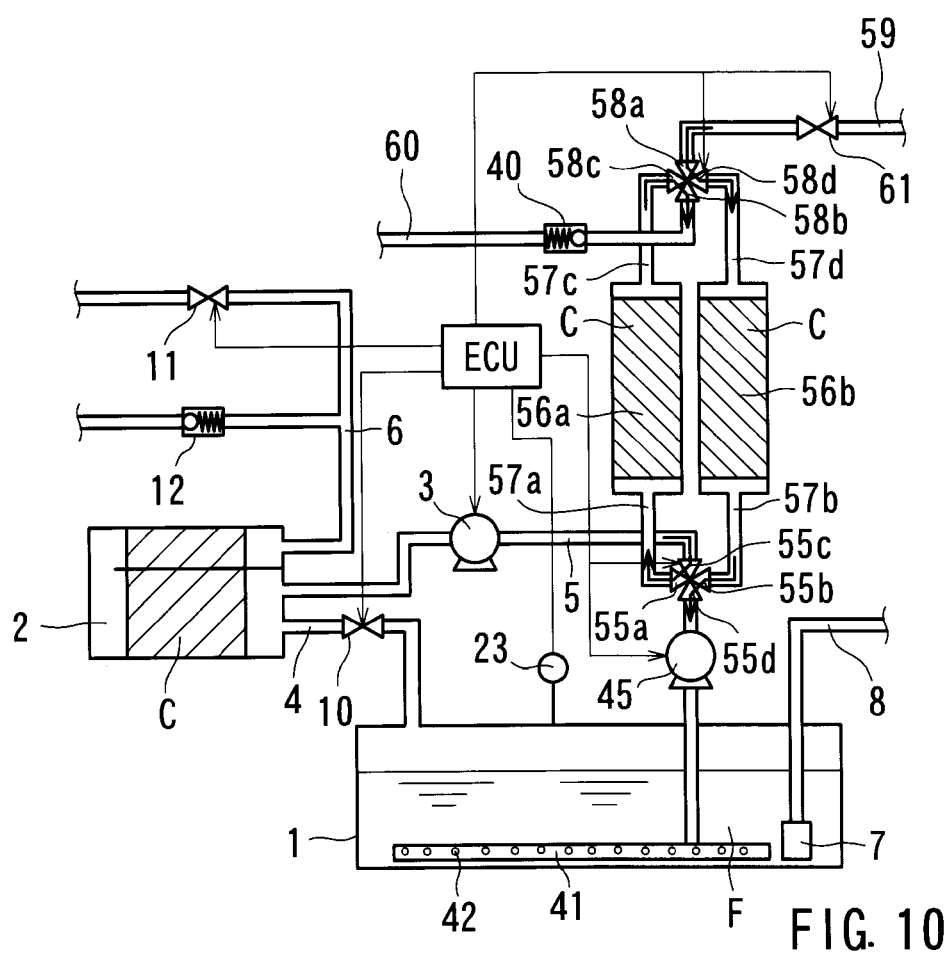
FIG. 10 is a schematic view of a sixth embodiment of fuel vapor processors.

A sixth embodiment has a pressure swing adsorption device in addition to the basic configuration of the first embodiment. In particular, as shown in FIG. 10, a four-way valve 55 is disposed on the recovery pipe 5, and the pressure swing adsorption device (PSA) 56 is communicated with the four-way valve 55. The PSA 56 is two-tower type PSA having a first adsorption tower 56a and a second adsorption tower 56b parallel to each other such that when one of the adsorption towers adsorbs the fuel vapor, the other desorbs the fuel vapor trapped therein. The two towers alternately adsorb and desorb the fuel vapor. The first and the second adsorption towers are filled with the adsorbent C made of activated carbon or the like, which the fuel vapor adsorbs on and air passes through. The first adsorption tower 56a is connected with a first pipe 57a at one end and with a third pipe 57c at the other end, whereas the second adsorption tower 56b is connected with a second pipe 57b at one end and with a fourth pipe 57d at the other end such that the first adsorption tower 56a and the second adsorption tower 56b are parallel to each other.

The four-way valve 55 has four valves 55a, 55b, 55c and 55d, which are connected with the first pipe 57a, the second pipe 57b, an upstream side of the recovery pipe 5 and a downstream side of the recovery pipe 5, respectively. A four-way valve 58 including four valves 58a, 58b, 58c and 58d is also provided at the other end of the PSA 56. The valves 58c and 58d are connected with the third pipe 57c and the fourth pipe 57d, respectively. The valve 58a is connected with an air intake conduit 59 for taking fresh air into the PSA 56, and the valve 58c is connected with an exhaust conduit 60 for releasing air passing through the PSA 56 into the atmosphere. Each of the four-way valves 55 and 58 is made of a solenoid valve, which is controlled to be opened and closed by the ECU 15. The air intake conduit 59 has an air intake conduit valve 61 composed of a solenoid valve, which is controlled to be opened and closed by the ECU 15. In addition, the second pressure regulation valve 40 for allowing gas flow from the PSA 56 toward the atmosphere when pressure above a predetermined value (for example, 150 kPa) acts on the valve 40 is disposed on the exhaust conduit 60. The decompression pump 45 is disposed on the recovery pipe 5 between the four-way valve 55 and the fuel tank 1. Further, the pressure sensor 23 is disposed on the fuel tank 1 in order to allow back-purge.

When the ignition switch or the like is in off position, the vapor pipe valve 10 and the air pipe valve 11 are open. In this state, gas flow in the sixth embodiment is same as that of the first embodiment. Here, at this time, the air intake conduit valve 61 is closed. When the ignition switch or the like is turned on, the vapor pipe valve 10 and the air pipe valve 11 are closed, and the air intake conduit valve 61 is opened. Simultaneously, the vacuum pump 3 and the decompression pump 45 are driven. Furthermore, the valve 55a and the valve 55c, the valve 55b and the valve 55d, the valve 58a and the valve 58d, and the valve 58b and the valve 58c are communicated with each other, respectively, such that the first adsorption tower 56a adsorbs the fuel vapor, whereas the second adsorption tower 56b desorbs the fuel vapor. In particular, the desorbed gas flowing through the recovery pipe 5 passes through the valve 55c, the valve 55a and the first pipe 57a and then into the first adsorption tower 56a as shown by an arrow in FIG. 10. Then, the fuel vapor in the desorbed gas is trapped in the first adsorption tower 56. Whereas, air in the desorbed gas passes through the first adsorption tower 56a, the third pipe 57c, the valve 58c, the valve 58b and exhaust conduit 60, and then flows into the atmosphere. At this time, an inner space of the first adsorption tower 56a is kept at a certain pressurized condition due to the second pressure regulation valve 40 on the exhaust conduit 60, so that adsorptive property for the fuel vapor is improved, and the PSA 56 traps highly concentrated fuel vapor.

On the other hand, fresh air suctioned due to the decompression pump 45 through the air intake conduit 59 is provided to the second adsorption tower 56b. In particular, the air intake conduit 59, the valve 58a, the valve 58b, the fourth pipe 57d, the second adsorption tower 56b, the second pipe 57b, the valve 55b and the valve 55d are communicated, so that fresh air is suctioned through these members due to the decompression pump 45. Thus, in a case that the fuel vapor is trapped in the second adsorption tower 56b, the fuel vapor is removed and recovered to the fuel tank 1. After a predetermined period of time, the vacuum pump 3 is stopped, and condition of this system returns to one where the ignition switch is in off position.

Figure 11:
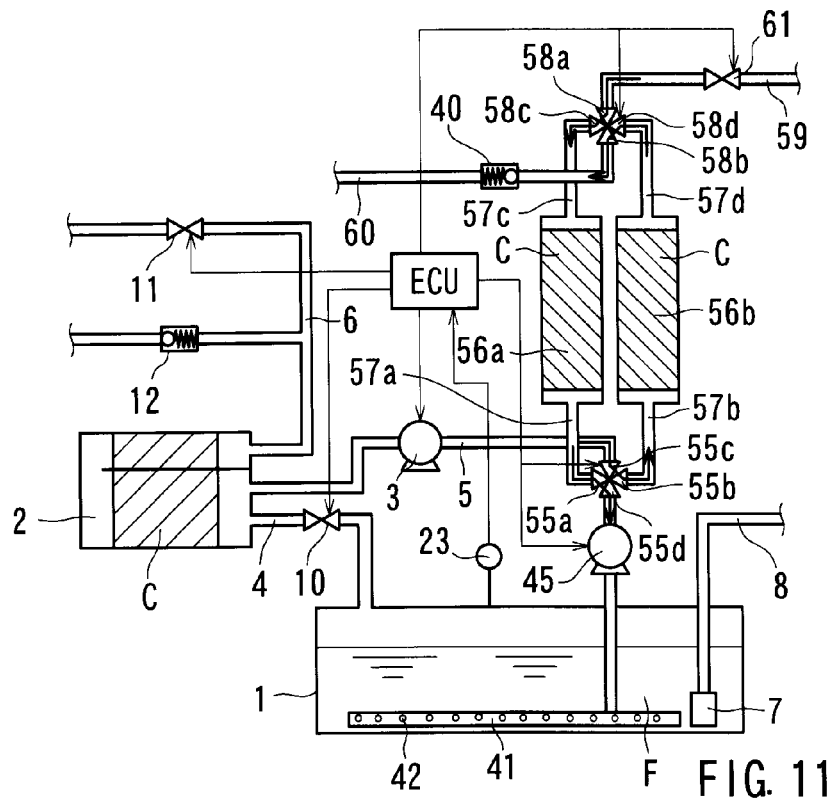
FIG. 11 is a schematic view showing gas flow in another mode different from FIG. 10.

Next, the ignition switch or the like is turned on again in order to drive the vacuum pump 3, etc., the valves 55 and 58 are controlled such that the first adsorption tower 56a desorbs the fuel vapor, whereas the second adsorption tower 56b adsorbs the fuel vapor as shown by an arrow in FIG. 11. In particular, the valve 55a and the valve 55d, the valve 55b and the valve 55c, the valve 58a and the valve 58c, and the valve 58b and the valve 58d are communicated with each other, respectively. The desorbed gas flowing though the recovery pipe 5 flows through the valve 55c, valve 55b, and the second pipe 57b and then into the second adsorption tower 56b, so that the fuel vapor in the desorbed gas is trapped in the second adsorption tower 56b. Whereas, air in the desorbed gas passes through the second adsorption tower 56b, the fourth pipe 57d, the valve 58d, the valve 58b and the exhaust conduit 60, and then into the atmosphere.

On the other hand, the air intake conduit 59, the valve 58a, the valve 58c, the third pipe 57c, the first adsorption tower 56a, the first pipe 57a, the valve 55a, and the valve 55d are communicated, so that fresh air suctioned through the air intake conduit 59 due to the decompression pump 45 is provided to the first adsorption tower 56a. Therefore, the fuel vapor previously trapped in the first adsorption tower 56a in high concentration is removed and recovered into the fuel tank 1. After a predetermined period of time, the vacuum pump 3 and the like are stopped. In accordance with the sixth embodiment, the fuel vapor is trapped by the PSA 56 in high concentration, and then is recovered, so that devolatilization of the fuel vapor is enhanced, and recovery efficiency is improved. Other configurations of the sixth embodiment are same as those of the first embodiment, and the mechanism for back-purge is same as that of the second embodiment, so that corresponding elements are labeled with the same symbols or reference numbers, and they will not be described.

Figure 12:
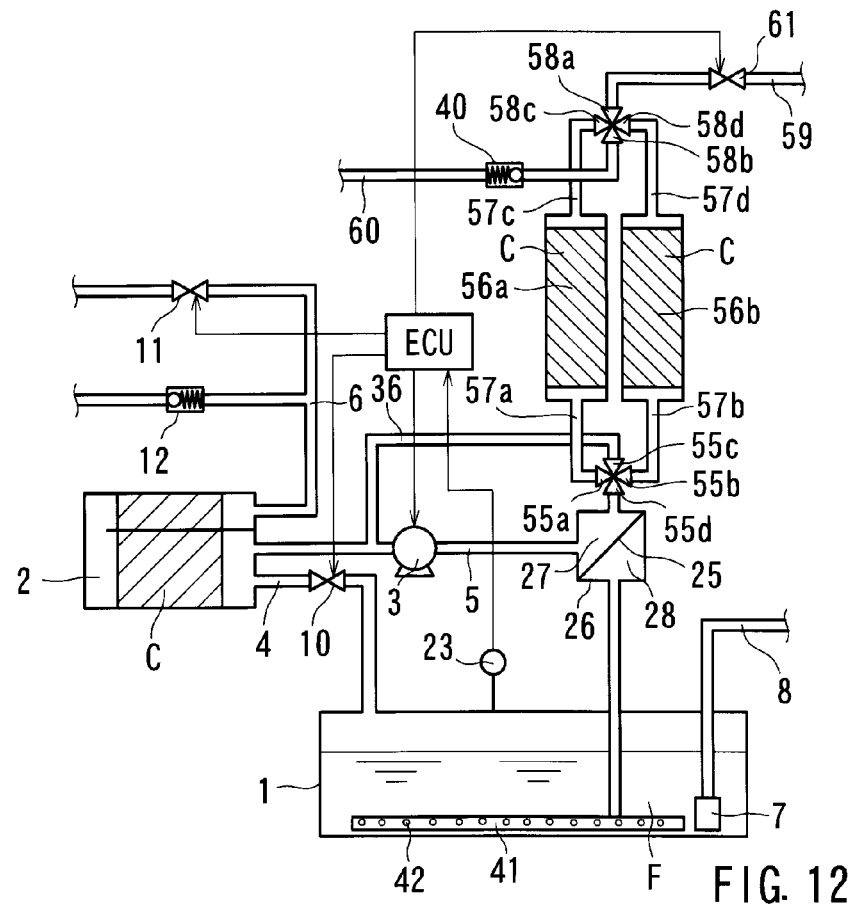
FIG. 12 is a schematic view of a seventh embodiment of fuel vapor processors.

A seventh embodiment includes the pressure swing adsorption device 56 and the separation membrane. In particular, as shown in FIG. 12, the receiving chamber 27 for the separation membrane 25 and the valve 55d are communicated with each other, and the valve 55c is connected with the circulation pipe 36. Separation mechanism by the separation membrane 25 is same as that of the fourth embodiment, and adsorbing and desorbing mechanism by the PSA 56 is same as that of the sixth embodiment. The higher the ratio of the fuel vapor in a provided gas (desorbed gas) is, the higher the separation efficiency tends to be. In addition, in the seventh embodiment, the desorbed gas including highly concentrated desorbed gas is led to the separation membrane 25, so that the separation efficiency by the separation membrane 25 is high, and thus treatment efficiency for the fuel vapor is also high. Other basic configurations of the seventh embodiment are same as those of the first embodiment or fourth embodiment, and the mechanism for back-purge is same as that of the second embodiment. Thus, corresponding elements are labeled with the same symbols or reference numbers, and they will not be described.

Figure 13:
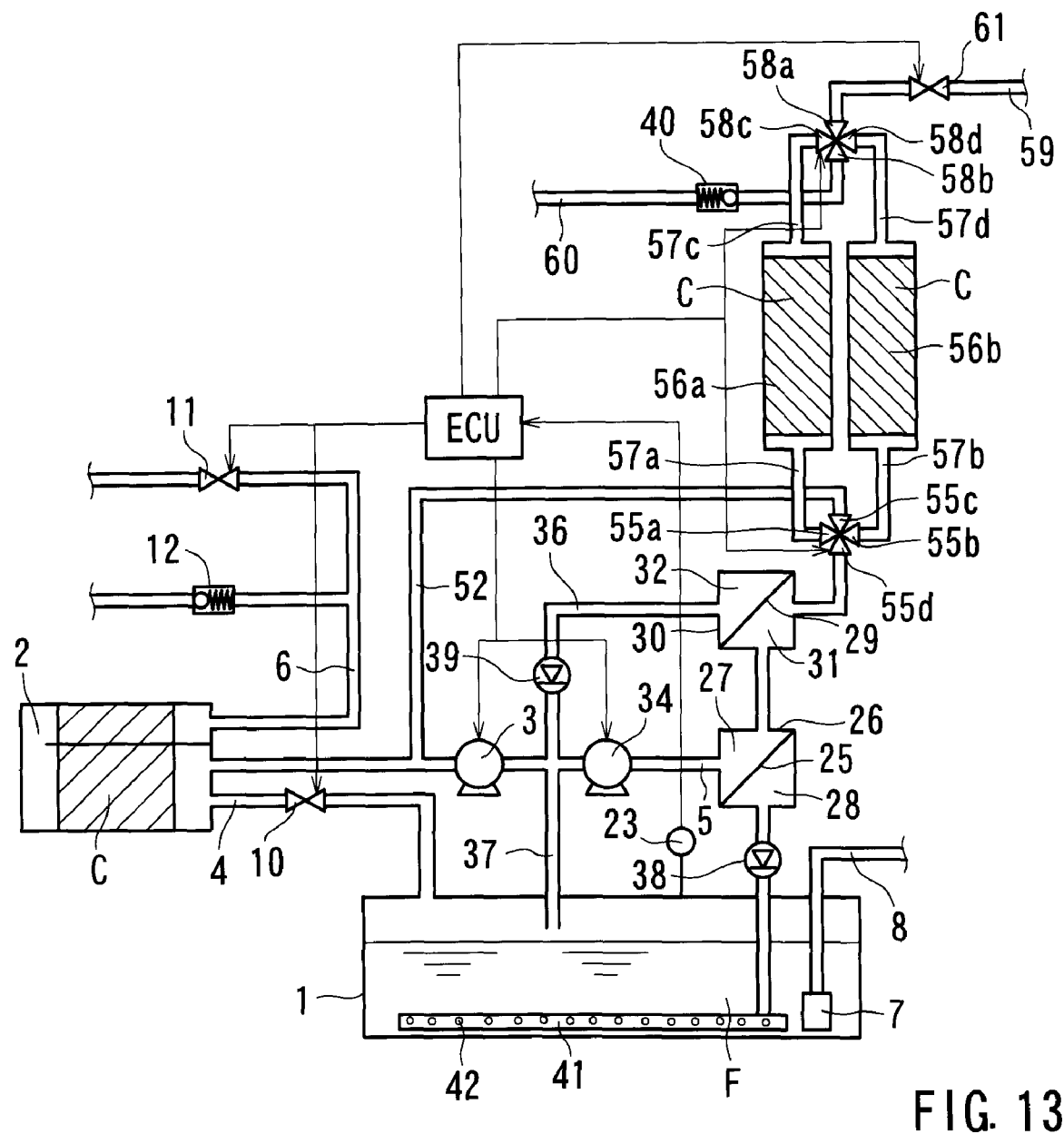
FIG. 13 is a schematic view of an eighth embodiment of fuel vapor processors.

The pressure swing adsorption device 56 can be applied to the two-step separation system. An eighth embodiment shown in FIG. 13 substantially corresponds to a combination of the third embodiment with the PSA 56. The receiving chamber 31 for the second separation membrane 29 and the valve 55d are communicated with each other, and the valve 55c is connected with the second circulation pipe 52. Other configurations of the eighth embodiment are same as those of the third embodiment or the sixth embodiment. Thus, corresponding elements are labeled with the same symbols or reference numbers, and they will not be described.

The pressure swing adsorption device can be modified variously other than the configurations shown in FIG. 10-13. For example, each of the sixth to eighth embodiments includes the two-tower type PSA 56, however three or more towers can be disposed parallel to each other. In this case, adsorption and desorption of the fuel vapor are alternately carried out in each of the adsorption towers, so that treatment efficiency for the fuel vapor is further improved. In addition, the PSA 56 is filled with the adsorbent C as same as the canister 2 as described above. The adsorbent C adsorbs a large amount of the fuel vapor in low temperature, and adsorbs a small amount of the fuel vapor in high temperature. However, when adsorbing the fuel vapor, the adsorbent C is heated by adsorption heat (condensation heat), whereas when desorbing the fuel vapor, the adsorbent C is cooled by desorption heat (vaporization heat). Therefore, heat storage material is preferably contained in each tower of the PSA 56 in order to prevent temperature alternation of the adsorbent C.

Figure 14:
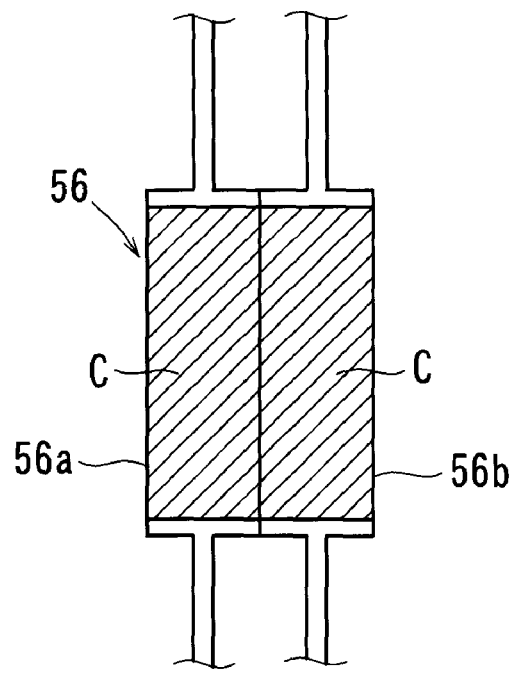
FIG. 14 is a schematic view of a first variant of pressure swing adsorption devices.

As shown in FIG. 14, adsorption towers are preferably disposed in contact with each other. In accordance with this configuration, it is able to effectively use heat generated in each adsorption tower alternating adsorption and desorption in order to prevent temperature alternation of the adsorbent C. For example, heat generated by adsorption of the fuel vapor in a first adsorption tower is transferred to a second adsorption tower in order to prevent temperature reduction in the second adsorption tower. In addition, temperature of the first adsorption tower decreases due to heat transfer to the second adsorption tower cooled by desorption of the fuel vapor, so that temperature increase in the first adsorption tower can be prevented.

Figure 15:
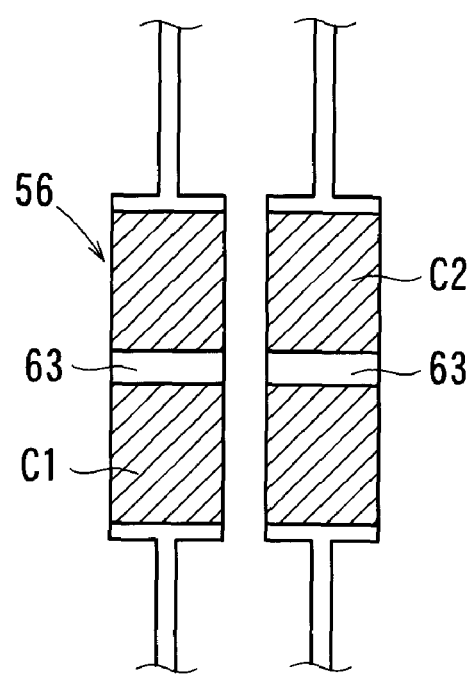
FIG. 15 is a schematic view of a second variant of pressure swing adsorption devices.
Figure 16:
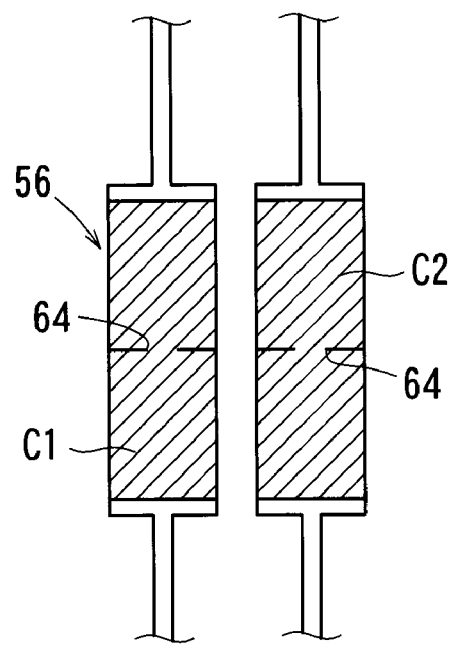
FIG. 16 is a schematic view of a third variant of pressure swing adsorption devices.
Figure 17:
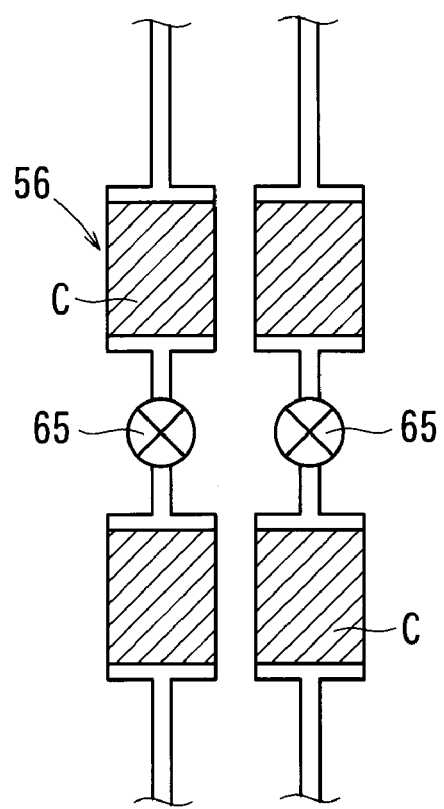
FIG. 17 is a schematic view of a fourth variant of pressure swing adsorption devices.
Figure 18:
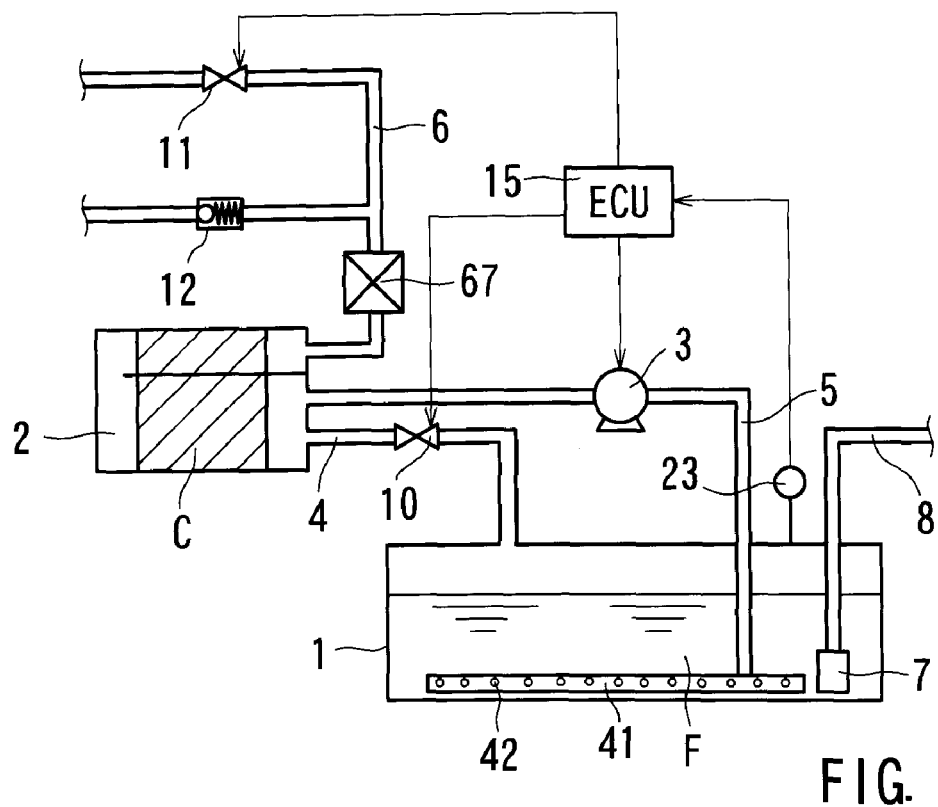
FIG. 18 is a schematic view of a ninth embodiment of fuel vapor processors.

When the processor is in operation while driving a vehicle, the fuel vapor flows into the adsorption tower from an inlet and is gradually adsorbed by the adsorbent in the adsorption tower, so that the amount of the adsorbed fuel vapor decreases toward an outlet. However, when the processor is stopped, the fuel vapor adsorbed near the inlet tends to desorb from the adsorbent and diffuse toward the outlet over time. In a case that the vehicle is parked for a long time, there is a risk that the fuel vapor reaches the outlet and leaks from the adsorption tower during parking. Thus, each adsorption tower of the PSA 56 preferably has a diffusion preventer for the fuel vapor. For example, as shown in FIG. 15, an inner space of the each adsorption tower is preferably divided into two areas filled with the adsorbent C by an air space 63. In this case, there is the air space 63 between an adsorbent area C1 near the inlet and an adsorbent area C2 near the outlet, so that diffusion of the fuel vapor is reduced. Alternatively, as shown in FIG. 16, the inner space of each the adsorption tower could be divided into two areas by a partition 64 with an aperture. Due to this partition 64, gas flow from the adsorbent area C1 near the inlet to the adsorbent area C2 near the outlet is partially prevented, so that the diffusion of the fuel vapor is reduced. Furthermore, as shown in FIG. 17, each adsorption tower is composed of two parts in a gas flow direction, and a regulator 65 can be disposed between the parts. In this case, when pressure at a predetermined value does not act on the regulator, gas cannot pass through the regulator, so that the diffusion of the fuel vapor can be certainly prevented.

In addition, in the sixth to eighth embodiments, the exhaust conduit 60 of the PSA 56 can be connected with the air pipe 6.

A ninth embodiment has the basic configuration of the first embodiment and further includes an ozone generator. In particular, an ozone generator 67 is disposed on the air pipe 6 between the air pipe valve 11 and the canister 2. The ozone generator 67 is not limited to one of specific devices, and devices for discharge method such as silent discharge or creeping discharge, electrolytic method, or ultraviolet lamp method can be used. Here, the fuel tank 1 is provided with the pressure sensor 23 in order to allow back-purge.

When the ignition switch or the like is turned on, the ozone generator 67 is driven together with the vacuum pump 3. Thus, fresh air is led to the canister 2 via the pressure regulation valve 12, and ozone ($O_3$) is also led to the canister 2 from the ozone generator 67. Then, ozone is adsorbed by the adsorbent C in the canister 2 and simultaneously degrades into oxygen ($O_2$). Heat emitted by adsorption and degradation of ozone reduces temperature reduction of the adsorbent C during desorption of the fuel vapor. Due to this effect, heat storage material, heater or the like for reducing temperature alternation of the adsorbent C is not required, so that the canister 2 can fully be filled with the adsorbent C, and decrease in adsorption capacity for the fuel vapor can be prevented.

In addition, ozone can degrade the fuel vapor consisting of hydrocarbon. Reaction of ozone and the fuel vapor is shown by a following formula.

$$O_3 + HC \rightarrow H_2O + O_2 + CO_2$$

Therefore, the fuel vapor remaining on the adsorbent C can be degraded by ozone. And, ozone flows into the canister 2 through the air pipe 6, so that the fuel vapor remaining on the adsorbent C near the air pipe 6 is preferentially degraded. Therefore, it is able to prevent leak of the fuel vapor into the air pipe 6 during stopping the processor. Other basic configurations of the ninth embodiment are same as those of the first embodiment, and the mechanism for back-purge is same as that of the second embodiment. Therefore, corresponding elements are labeled with the same symbols or reference numbers, and they will not be described.

Figure 19:
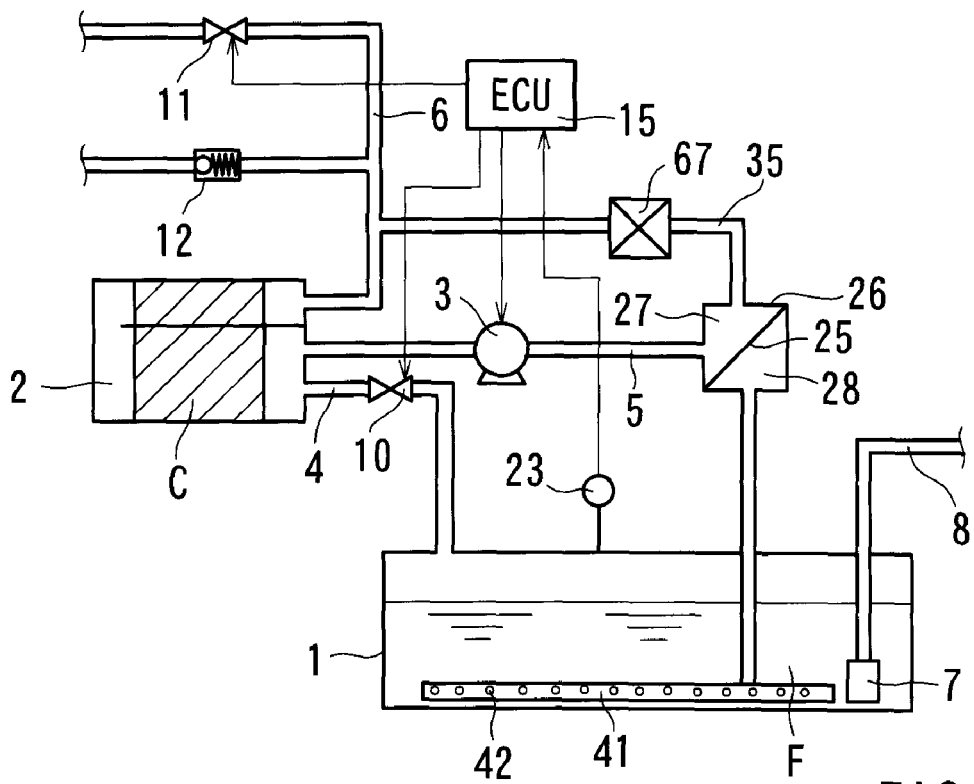
FIG. 19 is a schematic view of a tenth embodiment of fuel vapor processors.

A tenth embodiment has the basic configuration including the separation membrane with the ozone generator and is similar to the seventh embodiment including the ozone generator instead of the pressure swing adsorption device 56. In particular, as shown in FIG. 19, the ozone generator 67 is disposed on the return pipe 35. When the ignition switch or the like is turned on, the ozone generator 67 is driven together with the vacuum pump 3. Then, when the diluted gas separated by the separation membrane 25 is returned to the canister 2 via the return pipe 35, the diluted gas is passed through the ozone generator 67, so that a small amount of the fuel vapor contained in the diluted gas is degraded due to the ozone. Thus, because concentration of the fuel vapor in the diluted gas, which is separated by the separation membrane 25 and is led into the canister 2 with fresh air, can be reduced adequately, desorption efficiency for the fuel vapor is improved.

In addition, an amount of ozone produced by the ozone generator 67 is preferably larger than that required for degradation of the fuel vapor in the diluted gas, such that remaining ozone after degradation of the fuel vapor is also led into the canister 2. Therefore, temperature reduction of the adsorbent C can preferably be prevented as well as degradation of the fuel vapor. Furthermore, ozone has less opportunity to contact with the fuel vapor in gas phase (in return pipe 35 or air pipe 6), so that there is a limit on degradation of the fuel vapor due to ozone. However, when the remaining ozone adsorbs onto the adsorbent C, the ozone can certainly contact with the fuel vapor similarly adsorbing onto the adsorbent C, so that the fuel vapor is adequately degraded. Other configurations of the tenth embodiment are same as those of the first or the seventh embodiment, and the mechanism for back-purge is same as that of the second embodiment. Therefore, corresponding elements are labeled with same symbols or reference numbers, and they will not be described.

In the ninth embodiment and the tenth embodiment each having the ozone generator 67, the amount of ozone led into the canister 2 is preferably as much as possible from a functional standpoint, however, ozone in high density has a risk of explosion, and when adsorbing onto the adsorbent C, there is a risk of ignition. Therefore, an amount of ozone led into the canister 2 is preferably less than 300 ppm.

Figure 20:
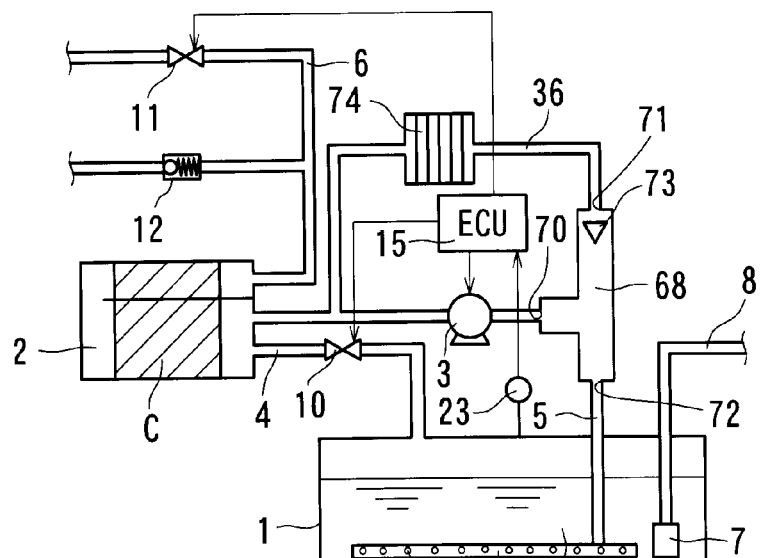
FIG. 20 is a schematic view of an eleventh embodiment of fuel vapor processors.
Figure 21:
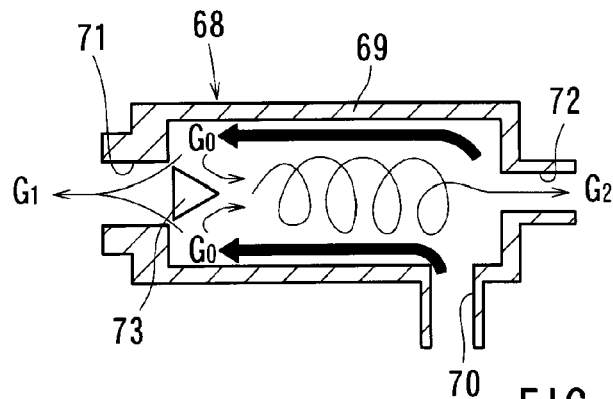
FIG. 21 is a cross sectional view showing separating mechanism of vortex tube.

An eleventh embodiment has a vortex tube (VT) capable of dividing the desorbed gas into low temperature gas and high temperature gas in addition to the basic configurations of the first embodiment. Here, "high" temperature and "low" temperature are relatively defined based on comparison of both temperatures. In particular, as shown in FIG. 20, the VT 68 is disposed on the recovery pipe 5 between the vacuum pump 3 and the fuel tank 1. As shown in FIG. 21, the VT 68 is composed of a hollow cylindrical tube 69 having a gas inlet 70, a warm gas outlet 71 and a cold gas outlet 72 each fluidly communicating inside and outside of the tube 69. The warm gas outlet 71 and the cold gas outlet 72 are situated on either ends of the tube 69 in an axial direction and are opposed to each other. The gas inlet 70 is situated on a circumferential wall of the tube 69 and near the cold gas outlet 72. In addition, a conical valve 73, which is slightly smaller than a diameter of the warm gas outlet 71 and is tapered toward the cold gas outlet 72, is disposed at an entrance of the warm gas outlet 71 (inner side of the tube 69). As shown in FIG. 20, an upstream side of the recovery pipe 5 (near the canister 2) is connected with the gas inlet 70 of the VT 68, and a downstream side of the recovery pipe 5 (near the fuel tank 1) is connected with the cold gas outlet 72. That is, the gas inlet 70 of the VT 68 is communicated with the canister 2 via the recovery pipe 5, and the cold gas outlet 72 of the VT 68 is communicated with the fuel tank 1 via the recovery pipe 5. The warm gas outlet 71 of the VT 68 is connected with the circulation pipe 36 for circulating the high temperature gas into the recovery pipe 5. A condenser 74 as a cooler is disposed on the circulation pipe 36. In addition, the pressure sensor 23 is disposed on the fuel tank 1 for allowing back-purge.

When the desorbed gas from the canister 2 is led into the VT 68 through the gas inlet 70 due to action of the vacuum pump 3, the desorbed gas $G_0$ flows along an inner circumferential surface of the tube 69 toward the warm gas outlet 71 as shown in FIG. 21. The desorbed gas $G_0$ reaches the valve 73, and then is separated into the high temperature gas $G_1$ and the low temperature gas $G_2$. In particular, the high temperature gas $G_1$ flows around the valve 73 and flows out of the air gas outlet 71. The low temperature gas $G_2$ is returned toward the cold gas outlet 72 due to the valve 73, so that the low temperature gas $G_2$ spirally flows through a central area of the tube 69 in a radial direction, and then flows out of the cold gas outlet 72. The lower temperature gas $G_2$ discharged from the cold gas outlet 72 is recovered into the fuel tank 1 through the recovery pipe 5. Whereas, the high temperature gas $G_1$ discharged from the warm gas outlet 71 is cooled by the condenser 74, and then is returned to the recovery pipe 5 above the vacuum pump 3 through the circulation pipe 36.

In accordance with the eleventh embodiment, the low temperature gas $G_2$ is separated from the desorbed gas $G_0$ in order to enhance condensation of the fuel vapor and recover the liquefied fuel. At this time, no gas is led into the fuel tank 1 other than gas solved in the fuel F, so that it is able to inhibit increase in the inner pressure of the fuel tank 1 adequately. In addition, the fuel F in the fuel tank 1 is cooled by the low temperature gas $G_2$, so that re-vaporization of the fuel can be reduced. Furthermore, the low temperature gas $G_2$ is generated due to compressed gas from the vacuum pump 3 and power distribution is not required for this cooling mechanism, and thus, it is able to cool the fuel F without increasing subjects for power distribution. The valve 73 can work as regulator. Other basic configurations of the eleventh embodiment are same as those of the first embodiment, and the mechanism for back-purge is same as that of the second embodiment. Therefore, corresponding elements are labeled with the same symbols or reference numbers, and they will not be described.

Figure 22:
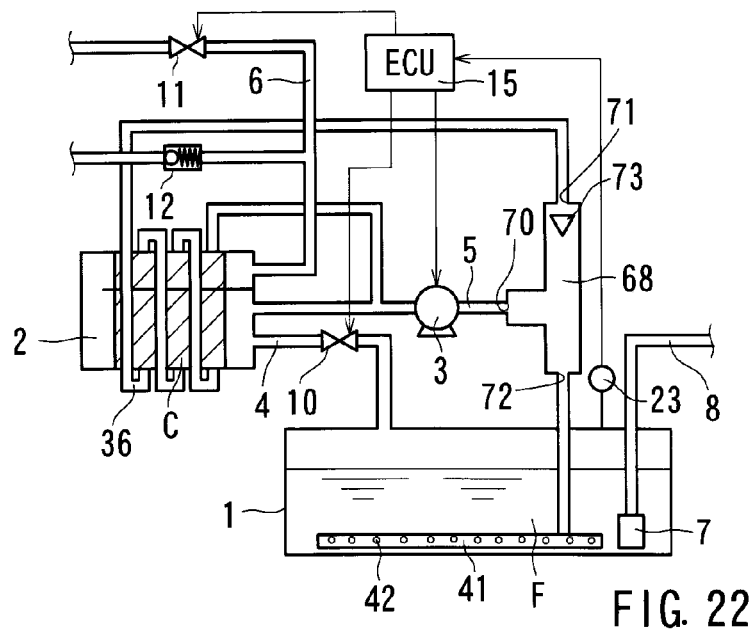
FIG. 22 is a schematic view of a twelfth embodiment of fuel vapor processors.

A twelfth embodiment substantially corresponds to a variant of the eleventh embodiment where a route of the circulation pipe is modified. In particular, as shown in FIG. 22, the circulation pipe 36 connected between the warm gas outlet 71 of the vortex tube 68 and the recovery pipe 5 is winded around the canister 2. Here, any condenser is not disposed on the circulation pipe 36. In accordance with this configuration, the high temperature gas discharged from the outlet 71 of the VT 68 flows around the canister through the circulation pipe 36. In this way, the circulation pipe 36 works as a heat exchanger, and heat provided by the high temperature gas is transmitted to the canister 2, so that temperature reduction of the adsorbent C can be prevented, and desorption efficiency of the fuel vapor can be improved. In addition, the bubbler 41 is disposed at an end of the recovery pipe 5 in order to improve solubility of the low temperature gas discharged from the cold gas outlet 72 of the VT 68. Other configurations of the twelfth embodiment are same as those of the eleventh embodiment, so that corresponding elements are labeled with the same symbols or reference numbers, and they will not be described.

Figure 23:
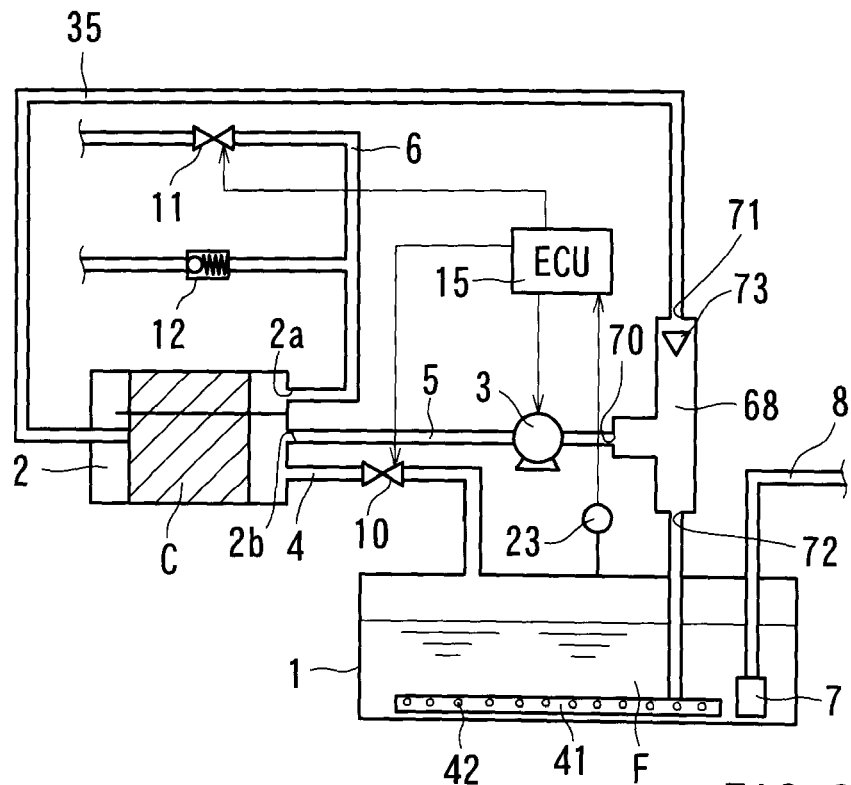
FIG. 23 is a schematic view of thirteenth embodiment of fuel vapor processors.

A thirteenth embodiment is a variant of the eleventh embodiment. In particular, as shown in FIG. 23, the warm gas outlet 71 of the vortex tube (VT) 68 is connected with the return pipe 35 communicating with the canister 2 instead of the circulation pipe 36. In accordance with this configuration, the high temperature gas discharged from the outlet 71 of the VT 68 is led into the canister 2. Thus, the adsorbent C is directly heated due to the high temperature gas, so that temperature reduction of the adsorbent C can be prevented adequately, and desorption efficiency for the fuel vapor can be improved.

In a case that the inner space of the canister 2 is divided into one near the air port 2a and the other near a purge port 2b, the return pipe 35 is preferably connected with that near the purge port 2b because of following reasons. The high temperature gas has higher density of the fuel vapor than the diluted gas separated by the separation membrane, so that connection of the return pipe 35 with the canister 2 near an air port 2a increase a risk that the fuel vapor leaks into the air pipe 6 during shutdown of the system. In addition, the return pipe 35 preferably protrudes inside the canister 2 such that an end of the return pipe 35 is situated in contact with or near the adsorbent C in order to prevent the led gas from flowing to that near the air port 2a. Other configurations of the thirteenth embodiment are same as those of the eleventh embodiment, so that corresponding elements are labeled with the same symbols or reference numbers, and they will not be described.

Figure 24:
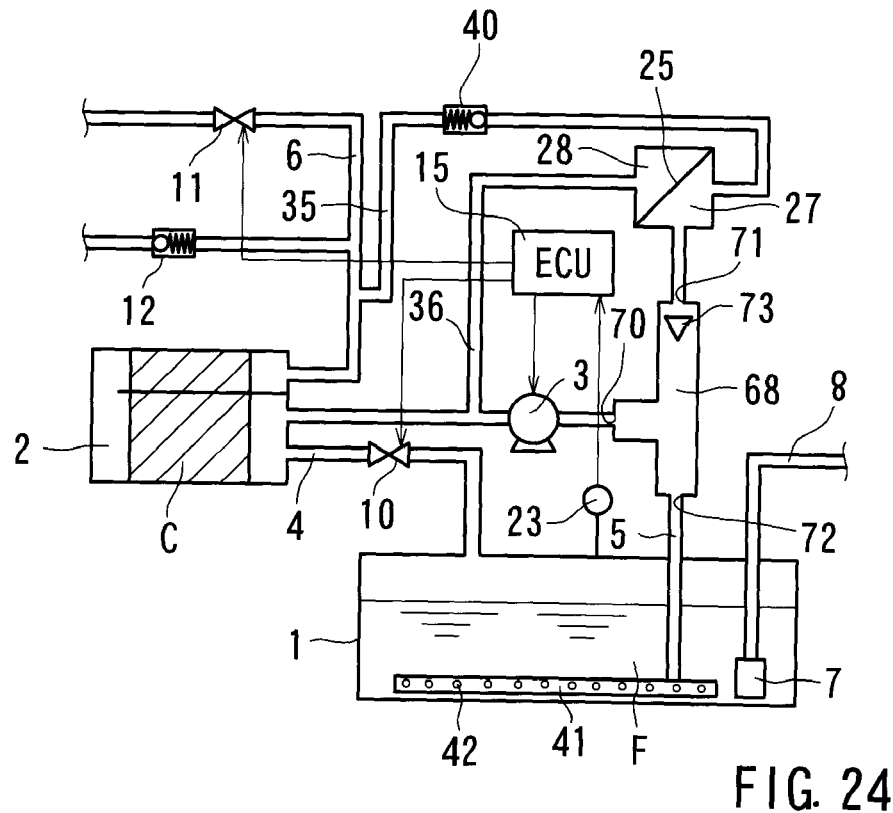
FIG. 24 is a schematic view of fourteenth embodiment of fuel vapor processors.

A fourteenth embodiment is a variant of the eleventh embodiment further including the separation membrane. In particular, as shown in FIG. 24, the separation membrane 25 is disposed downstream of the warm gas outlet 71 of the vortex tube (VT) 68. The warm gas outlet 71 of the VT 68 is communicated with the receiving chamber 27 for the separation membrane 25, and the permeated gas chamber 28 for the separation membrane 25 is communicated with the recovery pipe 5 upstream of the vacuum pump 3 via the circulation pipe 36. Further, the receiving chamber 27 for the separation membrane 25 is connected with the return pipe 35 communicating with the canister 2, and the second pressure regulation valve 40 is disposed on the return pipe 35.

The high temperature gas separated by the VT 68 is led into the receiving chamber 27 through the warm gas outlet 71 and is separated by the separation membrane 25 into the diluted gas having decreased concentration of the fuel vapor. Then, the diluted gas is returned into the canister 2 through the return pipe 35, so that treatment efficiency for the fuel vapor can be improved. Here, the inner space of the receiving chamber 27 for the separation membrane 25 is kept at a pressurized state due to the second pressure regulation valve 40, so that the receiving chamber 27 and the permeated gas chamber 28 have pressure difference across the separation membrane 25. The concentrated gas separated by the separation membrane 25 is returned to upstream of the vacuum pump 3 via the circulation pipe 36. Other configurations of the fourteenth embodiment are same as those of the eleventh embodiment of third embodiment, so that corresponding elements are labeled with the same symbol or reference number, and they will not be described.

Figure 25:
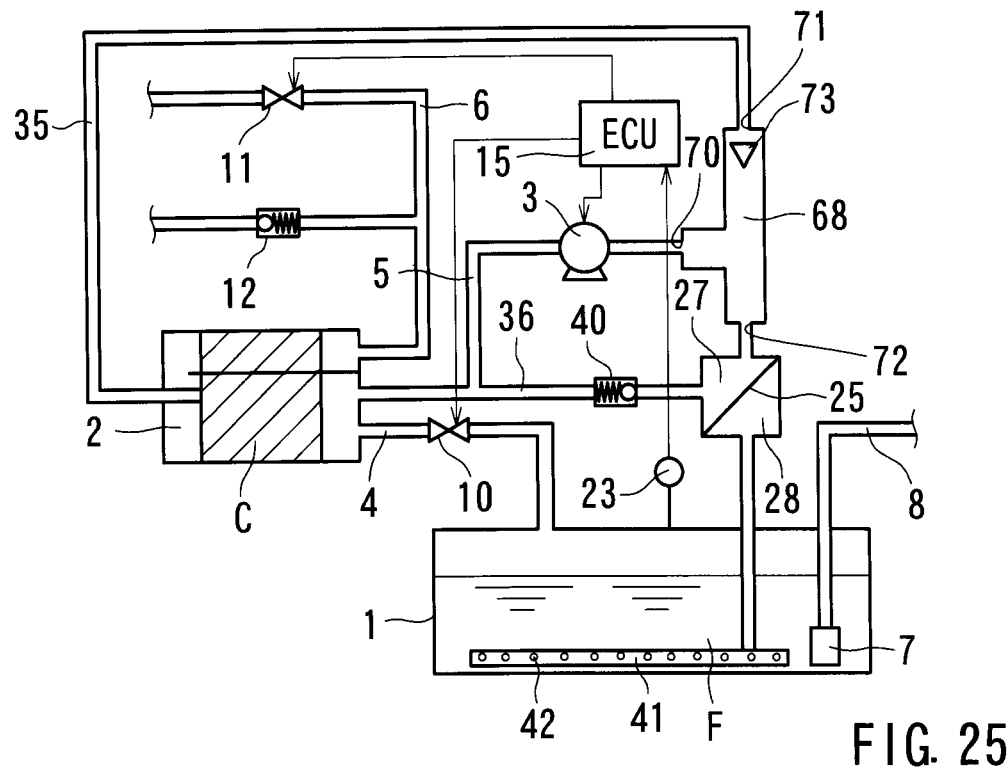
FIG. 25 is a schematic view of fifteenth embodiment of fuel vapor processors.

A fifteenth embodiment is a variant of the thirteenth embodiment further including the separation membrane. In particular, as shown in FIG. 25, the separation membrane 25 is disposed downstream of the cold gas outlet 72 of the vortex tube (VT) 68. The cold gas outlet 72 of the VT 68 is communicated with the receiving chamber 27 for the separation membrane 25, and the permeated gas chamber 28 for the separation membrane 25 is communicated with the fuel tank 1 via the recovery pipe 5. In addition, the receiving chamber 27 for the separation membrane 25 is connected with the circulation pipe 36 communicating with the recovery pipe 5 upstream of the vacuum pump 3. The second pressure regulation valve 40 is disposed on the circulation pipe 36.

The low temperature gas separated by the VT 68 is led into the receiving chamber 27 for the separation membrane 25 through the cold gas outlet 72 of the VT 68. Thus, the low temperature gas is further concentrated due to the separation membrane 25, and then is recovered into the fuel tank 1 and is devolatilized therein. Therefore, recovery efficiency can be further improved. In addition, the lower temperature is, the higher separation efficiency the separation membrane 25 shows, so that provision of the lower temperature gas to the separation membrane 25 improves the separation efficiency of the separation membrane 25. The receiving chamber 27 for the separation membrane 25 is kept at a pressurized state due to the second pressure regulation valve 40, and the receiving chamber 27 and the permeated gas chamber 28 have pressure difference across the separation membrane 25. The diluted gas remaining in the receiving chamber 27 for the separation membrane 25 is returned to the recovery pipe 5 upstream of the vacuum pump 3 via the circulation pipe 36. A configuration where the high temperature gas discharged from the warm gas outlet 71 of the VT 68 is directly returned into the canister 2 via the return pipe 35 is same as that of the thirteenth embodiment. Other configurations of the fifteenth embodiments are same as those of the thirteenth embodiment or the third embodiment, so that corresponding elements are labeled with same symbols or reference numbers, and they will not be described.

In the eleventh to fifteenth embodiments, a concentration sensor as a concentration detention means for detecting concentration of the fuel vapor in the desorbed gas is preferably disposed on the recovery pipe 5 between the canister 2 and the VT 68. In this case, detected signals from the concentration sensor are transmitted to the ECU 15, and the ECU 15 controls opening ratio of the valve 73 in the VT 68 depending on the concentration of the fuel vapor in the desorbed gas. In a case that the concentration sensor detects relatively high concentration of the fuel vapor in the desorbed gas from the canister 2, the opening ratio of the valve 73 is decreased in order to narrow the warm gas outlet 71, and discharge amount of the low temperature gas is increased, preferably. Thus, it is able to increase a recovery amount of the fuel vapor. On the other hand, in a case that the concentration of the fuel vapor in the desorbed gas from the canister 2 is relatively low, the opening ratio of the valve 73 is preferably increased in order to increase the amount of the high temperature gas discharged from the warm gas outlet 71. According to this operation, the recovery amount of the fuel vapor decreases, however, the concentration of the fuel vapor in the desorbed gas is low, so that there is no serious disadvantage. Whereas, the amount of the discharged high temperature gas increases, so that there is a great advantage that inhibitory effect against temperature alteration of the adsorbent C in the canister 2 can be increased.

Figure 26:
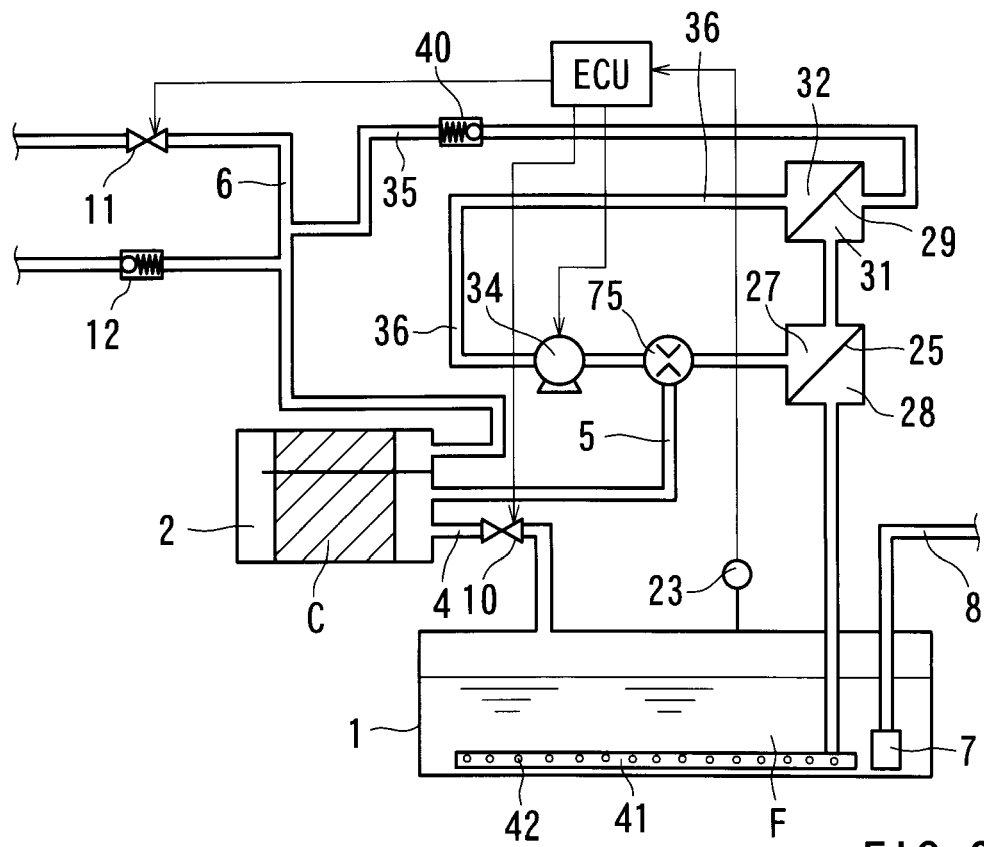
FIG. 26 is a schematic view of sixteenth embodiment of fuel vapor processors.

A sixteenth embodiment is a variant of the fuel vapor processor further having the separation membrane. Here, this embodiment will be described as a variant of the third embodiment having two-step separation mechanism. As shown in FIG. 7, the third embodiment has the vacuum pump 3 for providing negative pressure in the canister 2, and the pressure pump 34 for pressurizing the receiving chambers 27, 31 for the first and the second separation membranes 25, 29. In this case, pressure is likely to accumulate between the vacuum pump 3 and the pressure pump 34, so that it is necessary to control pump volumes and flow rates for both pumps 3 and 34. This problem also occurs in the fifth embodiment and the eighth embodiment where the vacuum pump 3 and the pressure pump 34 are aligned. Therefore, as shown in FIG. 26, the sixteenth embodiment has an ejector 75 as a suction means for desorbing the fuel vapor trapped in the canister 2 instead of the vacuum pump 3. As a prerequisite for this configuration, the pressure pump 34 is disposed on the circulation pipe 36, and pressure provided by the pressure pump 34 acts on the ejector 75.

Figure 27:
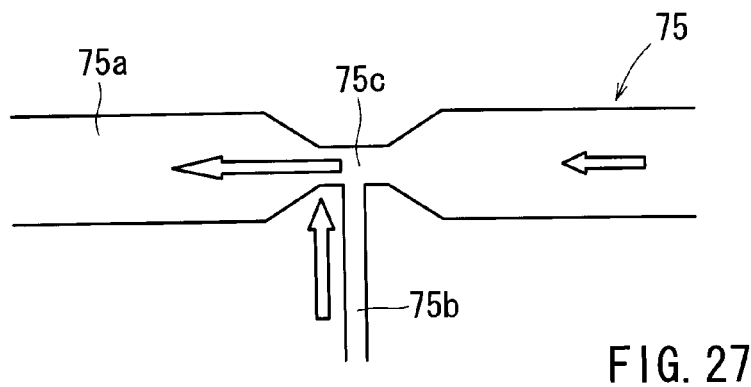
FIG. 27 is a cross sectional view of an ejector.

As shown in FIG. 27, the ejector 75 is composed of a T-shape pipe where a horizontal pipe 75a is connected with a vertical pipe 75b, and a connection area of the horizontal pipe 75a with the vertical pipe 75b has a smaller diameter than other area and is called as narrowed portion 75c. One end of the horizontal pipe 75a (for example, left end in FIG. 27) is connected with the pressure pump 34, whereas the other end of the horizontal pipe 75b (for example, right end in FIG. 27) is connected with the receiving chamber 27 for the separation membrane 25. The vertical pipe 75b is connected with the canister 2. The pressure pump 34 provides the second concentrated gas from the permeated gas chamber 32 for the second separation membrane 29 to the ejector 75. Thus, the second concentrated gas is pumped from one end of the horizontal pipe 75a toward the other end thereof. At this time, flow velocity of the second concentrated gas increases in the narrowed portion 75c, so that pressure decreases because of venturi effect. Therefore, negative pressure is provided in the vertical pipe 75b. In the sixteenth embodiment, while the pressure pump 34 provides pressure to the first and the second separation membranes 25 and 29, the ejector 75 can reduce pressure in the canister 2. That is, both pressurization and depressurization can be carried out by the single pressure pump 34, so that whole device can be simplified and minimized. In addition, it is not necessary to regulate pressure generated between the vacuum pump 3 and the pressure pump 34 unlike the third embodiment. In addition, strength of negative pressure provided by the ejector 75 depends on performance of the pressure pump 34.

Each configuration of the embodiments can be combined with each other. For example, the PSA 56 of the sixth to eighth embodiments can be combined with the ninth or tenth embodiment having the ozone generator 67, one of the eleventh to the fifteenth embodiments having the VT 68, or the sixteenth embodiment having the ejector 75. In a case that the PSA 56 is combined with the VT 68, the desorbed gas from the PSA 56 would be provided to the VT 68. In addition, the ozone generator 67 in the ninth or tenth embodiment can be combined with the third or fifth embodiment having the multi-step separation membrane system, one of the eleventh to fifteenth embodiments having the VT 68, or the sixteenth embodiment having the ejector 75. The VT 68 in the eleventh to fifteenth embodiments can be combined with the third or fifth embodiment having the multi-step separation membrane system, or the sixteenth embodiment having the ejector 75. Furthermore, these all elements can be combined as well as possible.

Figure 28:
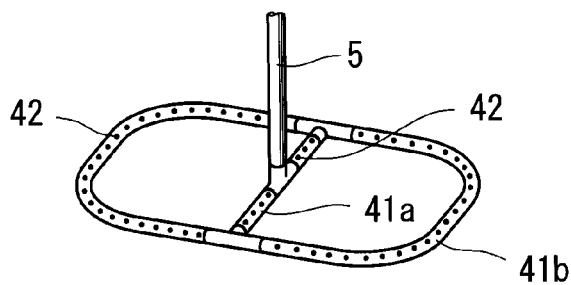
FIG. 28 is a perspective view of a first variant of bubblers.
Figure 29:
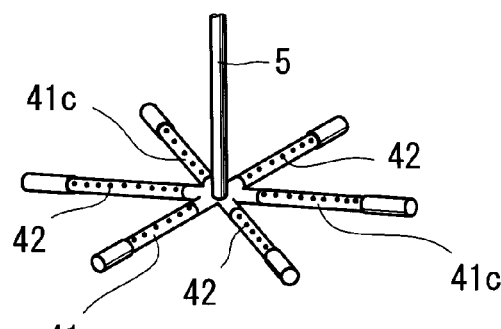
FIG. 29 is a perspective view of a second variant of bubblers.
Figure 30:
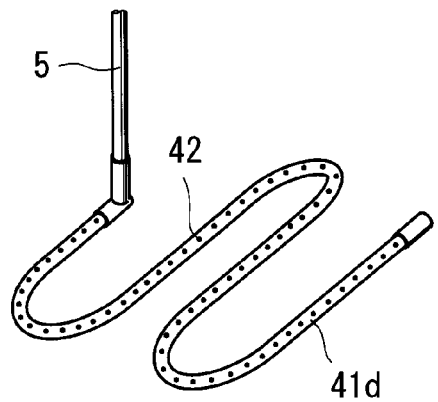
FIG. 30 is a perspective view of a third variant of bubblers.

The bubbler 41 employed in each embodiment is only necessary to spread throughout the bottom of the fuel tank 1, and shape of the bubbler 41 is not limited furthermore. For example, as shown in FIG. 28, a backbone pipe 41a straightly extending in a longitudinal direction or a horizontal direction is connected with an end of the recovery pipe 5, and both ends of the backbone pipe 41a can be connected with curved pipes 41b such that backbone pipe 41a and the curved pipes 41b connected with each other are in ring shape. The curved pipes 41b can be provided such that a plurality of rings are formed by the curved pipes 41b. As shown in FIG. 29, a plurality of straight pipes 41c can be connected with the end of the recovery pipe 5 in a radial fashion. In this case, one end of each straight pipe 41c is closed. In addition, as shown in FIG. 30, a pipe 41d can be connected with the end of the recovery pipe 5 and be disposed in a meandering shape. In this case, the end of the meandering pipe 41d is closed. The pipes 41a-d in FIG. 28-30 have a plurality of small pores 42 for producing small bubbles of the fuel vapor and releasing them into the fuel. In addition, the fuel vapor can be shaped in small bubbles by passing the fuel vapor through a suction filter of a pump unit integrated with the fuel pump 7.

In configuration having the return pipe 35, the end of the return pipe 35 can be communicated with the atmosphere such that the second or third diluted gas is released into the atmosphere. In addition, the vacuum pump 3 and the pressure pump 34 can be unitized. The device can be downsized due to unitization. Further, the second vapor pipe 37 can be provided on all embodiments. In this case, the check valve 47 can be disposed as necessary. In addition, in the seventh embodiment and the tenth to sixteenth embodiments, the check valve 47 can be preferably disposed at the end of the recovery pipe 5 or on the circulation pipe 36.

According to the fuel vapor processor of this disclosure, when the fuel vapor is desorbed due to the suction device, fresh air is led into the canister via the pressure regulator while keeping negative pressure in the canister. Thus, gas flow is ensured, and desorption efficiency can be drastically improved. Therefore, recovery amount of the fuel vapor is improved and the adsorbent in the canister can be renewed well, so that treating capacity for the fuel vapor is also improved. In addition, when the separation membrane is provided, concentration of the fuel vapor in gas provided to the separation membrane increases, so that separation efficiency is also improved.

The pressure regulator keeps negative pressure, so that complex control is not required during back-purge in a condition that the inner pressure of the fuel tank is negative pressure. Furthermore, it is able to stably keep negative pressure. The suction device is used during back-purge, so that it is able to drastically decrease the inner pressure of the canister, and time of initiation of back-purge is not limited to when the inner pressure of the fuel tank reaches allowable lower limit of negative pressure.

Due to the separation membrane capable of separating gas including the fuel vapor into the concentrated gas and the diluted gas and the pressure swing adsorption device, treating efficiency for the fuel vapor can be improved. For example, the fuel vapor can adsorb onto the adsorbent filled in the two-tower type pressure swing adsorption device, so that it is able to certainly prevent release of the fuel vapor into atmosphere while increasing recovery efficiency of the fuel vapor.

The adsorbent filled in the canister is characterized in that the lower temperature is, the higher adsorbing capacity is, whereas, the higher temperature is, the lower adsorbing capacity is. Thus, the temperature of the adsorbent is preferably high for desorption of the fuel vapor. However, when the fuel vapor adsorbs onto the adsorbent, the adsorbent is heated by adsorption heat, whereas, when the fuel vapor is desorbed from the adsorbent, the adsorbent is cooled by desorption heat. Here, when ozone is led into the canister together with fresh air during removal of the fuel vapor from the canister in order to heat the adsorbent in the canister due to ozone, desorpiton efficiency can be further improved. In particular, degradation of ozone led into the canister is promoted due to the adsorbent. When ozone is degraded, such reaction emits heat. The adsorbent can be heated by utilizing this emitted heat. Therefore, power distribution required for the heater such as piezo element is not required, so that it is preferred in terms of reduction of power consumption and loss in transmission power. In addition, it is not necessary to mix heat storage material with the adsorbent for preventing temperature alteration of the adsorbent, so that it is able to completely fill the adsorbent in the canister.

When the diluted gas separated by the separation membrane is returned to the canister, the diluted gas can be passed through the ozone generator in order to degrade the components of the fuel slightly included in the diluted gas due to ozone. Thus, concentration of the fuel vapor in the diluted gas can be further decreased, so that the adsorbent filled in the canister can be renewed adequately. In addition, the amount of the fuel vapor trapped near the air pipe also decreases, so that it is able to certainly prevent release of the fuel vapor into atmosphere. When remaining ozone after degradation of the fuel vapor is led into the canister, degradation of the components of the fuel and heating of the adsorbent can be carried out simultaneously, so that treating efficiency is further improved.

The treating efficiency or the like can be improved by providing the vortex tube capable of separating gas including the fuel vapor into low temperature gas and high temperature gas. By recovering low temperature gas separated by the vortex tube into the fuel tank, devolatilization of the fuel vapor is enhanced, and recovery efficiency is improved. Here, vortex tube is not required for power distribution unlike the cooler using the pettier element, so that it is able to cool the fuel vapor without increasing members required for power distribution. When cooled and liquefied fuel is recovered into the fuel tank, fuel temperature in the fuel tank decreases, so that the amount of re-vaporization of the fuel decreases. On the other hand, when the high temperature gas separated by the separation membrane is returned toward the canister, the canister can be heated due to the high temperature gas in order to improve desorption efficiency for the fuel vapor. In addition, the separation membrane is characterized in that the lower temperature is, the higher separation efficiency is. Therefore, by providing the low temperature gas to the separation membrane, separation efficiency by the separation membrane and thus treating efficiency for the fuel vapor can be improved. Here, high temperature and low temperature of gases separated by the vortex tube means relative temperature compared with each other.

When the pressure pump is disposed on the circulation pipe and the ejector as suction device is used, it is able to decrease the inner pressure of the canister without the vacuum pump. In addition, power distribution for the suction device is not required, so that it is able to reduce the number of members such as distributing cable, loss in power transmission, etc. In addition, device can be downsized compared with that provided with the vacuum pump. The strength of the negative pressure depends on performance of the pressure pump, so that it is not necessary to control pressure generated between the pressure pump and the vacuum pump.

This invention claims:

1. A fuel vapor processor comprising:
   a fuel tank;
   a canister for trapping fuel vapor generated in the fuel tank;
   a vapor pipe for leading the fuel vapor from the fuel tank into the canister;
   a recovery pipe for recovering the fuel vapor desorbed from the canister into the fuel tank;
   an air pipe for communicating the canister with the atmosphere;
   a suction device disposed on the recovery pipe for desorbing the fuel vapor trapped in the canister;
   a vapor pipe valve for opening and closing the vapor pipe;
   an air pipe valve for opening and closing the air pipe;
   a pressure regulator communicated with the air pipe between the air pipe valve and the canister for allowing gas flow from the atmosphere toward the canister; and
   wherein during desorption of the fuel vapor due to the suction device, the vapor pipe valve and the air pipe valve are closed, and negative pressure is kept in the canister such that the fuel vapor is desorbed from the canister and fresh air is led into the canister via the pressure regulator.

2. The fuel vapor processor according to claim 1 further comprising:
   a pressure detector disposed on the fuel tank for detecting inner pressure of the fuel tank,
   wherein when the pressure detector detects negative pressure in the fuel tank, the vapor pipe valve and the air pipe valve are closed, and the suction device is started.

3. The fuel vapor processor according to claim 1 further comprising:
   a separation membrane disposed on the recovery pipe downstream of the suction device for separating the fuel vapor from gas including the fuel vapor in order to obtain a concentrated gas having increased concentration of the fuel vapor and a diluted gas having decreased concentration of the fuel vapor.

4. The fuel vapor processor according to claim 1 further comprising:
   a pressure swing adsorption device having a plurality of adsorption towers for alternately adsorbing and desorbing the fuel vapor desorbed from the canister in each adsorption tower.

5. The fuel vapor processor according to claim 1 further comprising:
   an ozone generator disposed on the air pipe; and
   wherein during desorption of the fuel vapor from the canister, ozone is led into the canister together with the fresh air.

6. The fuel vapor processor according to claim 3 further comprising:
   a return pipe;
   an ozone generator disposed on the return pipe;
   wherein the diluted gas separated by the separation membrane is returned to the canister via the return pipe and the ozone generator.

7. The fuel vapor processor according to claim 1 further comprising:
   a vortex tube capable of separating gas including the fuel vapor desorbed from the canister into low temperature gas and high temperature gas.

8. The fuel vapor processor according to claim 3 further comprising:
   a circulation pipe;
   a pressure pump disposed on the circulation pipe;
   wherein concentrated gas separated by the separation membrane is provided to the separation membrane through the circulation pipe again; and
   wherein the suction device is an ejector for generating negative pressure due to the pressure pump.

* * * * *